United States Patent
Schott et al.

(10) Patent No.: US 11,391,601 B2
(45) Date of Patent: Jul. 19, 2022

(54) ARRANGEMENT, METHOD AND SENSOR FOR MEASURING AN ABSOLUTE ANGULAR POSITION USING A MULTI-POLE MAGNET

(71) Applicant: MELEXIS TECHNOLOGIES NV, Tessenderlo (BE)

(72) Inventors: Christian Schott, Lussy-sur-Morges (CH); Samuel Huber, Jenaz (CH)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 106 days.

(21) Appl. No.: 17/060,758

(22) Filed: Oct. 1, 2020

(65) Prior Publication Data
US 2021/0018336 A1 Jan. 21, 2021

Related U.S. Application Data

(63) Continuation of application No. 16/385,215, filed on Apr. 16, 2019, now Pat. No. 10,830,612, which is a (Continued)

(30) Foreign Application Priority Data

Aug. 23, 2012 (GB) ..................... 1215052

(51) Int. Cl.
G01R 33/06 (2006.01)
G01D 5/14 (2006.01)
G01D 5/244 (2006.01)

(52) U.S. Cl.
CPC ......... *G01D 5/145* (2013.01); *G01D 5/24438* (2013.01)

(58) Field of Classification Search
CPC .......... G01D 5/142; G01D 5/145; G01B 7/14; G01B 7/30; G01R 33/06; G01R 33/07;
(Continued)

(56) References Cited

U.S. PATENT DOCUMENTS 3,619,722 A 11/1971 Gill et al.
3,619,772 A 11/1971 Ellis
(Continued)

FOREIGN PATENT DOCUMENTS

CN 1303430 C 3/2007
CN 101243304 A 8/2008
(Continued)

OTHER PUBLICATIONS

Korean Office Action from corresponding KR Application No. 10-2019-7011617, dated Apr. 23, 2019.
(Continued)

*Primary Examiner* — Jermele M Hollington
*Assistant Examiner* — Taqi R Nasir
(74) *Attorney, Agent, or Firm* — Workman Nydegger

(57) ABSTRACT

A system for measuring an angular position of a rotor with respect to a stator, wherein the rotor is rotatable around a rotation axis, the system comprising: a magnetic source mounted on the rotor, having at least four magnet poles and providing a periodically repetitive magnetic field pattern with respect to the rotation axis; a sensor mounted on the stator and comprising a plurality of sensor elements for measuring at least one magnetic field component of the magnetic field and for providing a measurement signal thereof; the sensor being located substantially centered around the rotation axis, in a plane substantially perpendicular to the rotation axis at a first distance from the magnetic source; the sensor elements being located substantially on a circle at a second distance from the rotation axis; a calculator that determines the angular position by calculating it from the measurement signals.

11 Claims, 20 Drawing Sheets

Related U.S. Application Data continuation of application No. 14/422,452, filed as application No. PCT/EP2013/067577 on Aug. 23, 2013, now Pat. No. 10,309,801.

(58) Field of Classification Search
CPC .. G01R 33/072; G01R 33/075; G01R 33/077; G01R 33/09; G01R 33/091; G01R 33/093; G01R 33/095; G01R 33/096; G01R 33/098
See application file for complete search history.

(56) References Cited

U.S. PATENT DOCUMENTS

| | | | |
|---|---|---|---|
| 4,303,077 A | 12/1981 | Lewin et al. | |
| 4,486,664 A | 12/1984 | Wollnik | |
| 5,147,473 A | 9/1992 | Ueda | |
| 5,880,586 A | 3/1999 | Dukart et al. | |
| 6,184,680 B1 * | 2/2001 | Shinoura | G01D 5/142 324/252 |
| 6,545,462 B2 | 4/2003 | Schott et al. | |
| 7,728,584 B2 | 6/2010 | Takahashi | |
| 8,115,482 B2 | 2/2012 | Hughes | |
| 8,125,216 B2 | 2/2012 | Thomas et al. | |
| 8,169,214 B2 | 5/2012 | Zak | |
| 8,400,096 B2 | 3/2013 | Miyashita et al. | |
| 8,487,634 B2 * | 7/2013 | Masters | H02J 13/00002 324/512 |
| 9,625,278 B2 | 4/2017 | Nakamura et al. | |
| 9,654,129 B2 | 5/2017 | Sasaki et al. | |
| 2002/0021124 A1 | 2/2002 | Schott et al. | |
| 2006/0028204 A1 | 2/2006 | Oohira | |
| 2009/0051351 A1 | 2/2009 | Forsyth | |
| 2009/0102468 A1 | 4/2009 | Takahashi | |
| 2009/0174395 A1 | 7/2009 | Thomas et al. | |
| 2009/0315541 A1 * | 12/2009 | Zak | G01R 33/0094 324/207.2 |
| 2011/0062950 A1 | 3/2011 | Feledziak et al. | |
| 2011/0156505 A1 | 6/2011 | Miyashita et al. | |
| 2014/0070288 A1 | 3/2014 | Tomimatsu et al. | |

FOREIGN PATENT DOCUMENTS

| | | |
|---|---|---|
| CN | 101707879 A | 5/2010 |
| EP | 0916074 B1 | 7/2003 |
| EP | 1921423 A1 | 5/2008 |
| EP | 2028450 A2 | 2/2009 |
| FR | 2861458 A1 | 4/2005 |
| JP | 2006208049 A | 8/2006 |
| JP | 2007010449 A | 1/2007 |
| JP | 2010261898 A | 11/2010 |
| JP | 2011508891 A | 3/2011 |
| WO | 199854547 A1 | 12/1998 |
| WO | 2009153839 A1 | 12/2009 |

OTHER PUBLICATIONS

Great Britain Search Report from GB Application No. 1215052.0, dated Dec. 13, 2012.
International Search Report from PCT Application No. PCT/EP2013/067577, dated Oct. 17, 2013.
Japanese Office Action from JP Application No. 2015-527938, dated Jun. 20, 2017.
"Office Action Summary" of Japanese Office Action from JP Application No. 2015-527938, dated Jun. 20, 2017.

* cited by examiner

ARRANGEMENT, METHOD AND SENSOR FOR MEASURING AN ABSOLUTE ANGULAR POSITION USING A MULTI-POLE MAGNET

FIELD OF THE INVENTION

The present invention relates to the field of position sensors using a magnetic field. More in particular, the present invention relates to a contactless arrangement and a method for precise determination of an angular position less than 360°, using a magnetic field.

BACKGROUND OF THE INVENTION

The measurement of rotation angle is required in various applications, such as manual electrical switches or position detection of a motor or a valve or the like. Depending on cost and accuracy constraints, this task can be accomplished by various methods, such as mechanical contacts, potentiometers, optical encoders, or magnetic encoders.

Modern integrated circuit technology offers the possibility to integrate magnetic sensors and their readout and angle calculation electronics on a single die. This allows providing detectors of mechanical rotation which consist of a permanent magnet attached to a rotor and a monolithically integrated sensor attached to a stator, at competitive cost and good performance. The absence of mechanical contact between the rotor with the magnet and the stator with the sensor allows for hermetic encapsulation of the sensor. This permits wear-free angle measurements under harsh environmental conditions.

With the increase of compactness of electrical systems, particularly in automobiles with the arrival of hybrid engine systems, such position sensors are additionally exposed to external magnetic fields from nearby current conductors carrying strong current (e.g. more than 100 A). To maintain high sensing accuracy under such conditions, the sensor can be shielded by a ferromagnetic shield, or it must be made intrinsically robust towards such fields. This can be achieved by measuring a field gradient rather than an absolute field, since any external field is assumed constant in first approximation over the sensor as long as the sensor dimensions are small.

A sensor corresponding to this requirement is known from EP0916074B1. It describes a method and arrangement for contactless angle measurement using a magnetic field originating from a non rotation-symmetric magnet (in particular a two-pole magnet), whereby an axial field component (Bz) in parallel with the rotation axis is measured by sensor elements (so called "Horizontal Hall elements") at several separate spots inside a plane perpendicular to the rotation axis. Then the difference between diametrically opposed sensor element values is taken, such that any signal from a constant external (disturbance) field is subtracted and it is not appearing anymore in the angle signal.

A disadvantage of the described method and arrangement is its application for small angle measurement.

US20020021124 describes a position sensor using one or more so called magnetic field concentrators (abbreviated "IMC") to bend magnetic field lines, in combination with either horizontal Hall elements located under the IMC, or vertical Hall elements located tangentially to the edge of the IMC.

SUMMARY OF THE INVENTION

It is an object of the present invention to provide a sensor, and an arrangement and a method for measuring an absolute angular position of a rotor with respect to a stator, that is substantially insensitive to an external magnetic field.

It is in particular an object of embodiments of the present invention to provide such a sensor and arrangement and method for measuring an angular position smaller than 360° with an increased sensitivity.

This objective is accomplished by an arrangement, and method and sensor according to embodiments of the present invention.

In a first aspect, the present invention provides an arrangement for measuring an angular position of a rotor with respect to a stator. The arrangement comprises:

the rotor rotatable around a rotation axis;

the stator having a fixed position with respect to the rotation axis;

a magnetic source mounted on the rotor for creating a magnetic field, the magnetic source being a multi-pole magnet having at least four magnet poles and providing a periodically repetitive magnetic field pattern with respect to the rotation axis;

a sensor mounted on the stator and comprising a plurality of sensor elements for measuring at least one magnetic field component of the magnetic field and for providing a measurement signal indicative of the at least one magnetic field component, the sensor being located substantially centered around the rotation axis and being located in a plane substantially perpendicular to the rotation axis at a first distance from the magnetic source; the sensor elements being located substantially on a circle at a second distance from the rotation axis, and oriented for detecting the at least one magnetic field component; and means for calculating the angular position of the rotor from the provided sensor signals.

In a second aspect, the invention provides an arrangement for measuring an angular position of a rotor with respect to a stator. The arrangement comprises the rotor rotatable around a rotation axis; the stator having a fixed position with respect to the rotation axis; a magnetic source mounted on the rotor for creating a magnetic field, the magnetic source being a multi-pole magnet having a number of magnetic poles for generating a periodically repetitive magnetic field pattern with respect to the rotation axis, the number of magnetic poles being at least four; a sensor mounted on the stator and comprising a plurality of sensor elements for measuring at least one magnetic field component of the magnetic field and for providing a measurement signal indicative of the at least one magnetic field component, the sensor being located substantially centered around the rotation axis and being located in a plane substantially perpendicular to the rotation axis at a first distance from the magnetic source; the sensor elements being located substantially on a circle at a second distance from the rotation axis, and being oriented for detecting the at least one magnetic field component; the plurality of sensor elements being partitioned in at least a first group and a second group, the elements within each group being located at equidistant angular positions on the circle, the angular distance between an element of the first group and an element of the second group being equal to 180° divided by the number of magnetic poles of the magnetic source; means for calculating the angular position of the rotor from the provided signals, the means for calculating being adapted for calculating a first sum or first average of the signals provided by the sensor elements of the first group, and for calculating a second sum or second average of the signals provided by the sensor elements of the second group, and for determining the angular position of the rotor based on one or more values selected from the group consisting of the first sum, the first average, the second sum and the second average.

It is an advantage of using a magnetic field for determining an angular position that the sensor is contactless, thus there is no mechanical contact between a fixed and a movable part, thus no wear. Such sensors can advantageously be used in harsh environments.

It is an advantage of using a single integrated sensor comprising multiple sensor elements, in that the risk of misalignment of individual sensor elements or several sensors is eliminated, and interconnections of those sensors can be omitted.

It is an advantage of such an arrangement that the first group of elements is arranged for measuring a so called sine signal, while the second group of elements are arranged for measuring a cosine signal, together forming quadrature signals, from which the angular position can be accurately determined.

It is an advantage of such an arrangement that it allows any of the tangential, radial or axial field components of the magnetic source to be measured, instead of (only) axial field components.

It is an advantage of such an arrangement that it does not require the addition of a ferromagnetic yoke to the stator, for shaping the magnetic field of the rotor, which would add component cost and labor.

It is an advantage of such an arrangement that the magnetic source creates a magnetic field in close vicinity to the magnet and to the rotation axis, where the magnetic field components at locations lying on a circle concentric with the rotation axis, and at a short distance from the magnet, has tangential and/or radial and/or axial field components which vary in a substantially periodic, e.g. sine or cosine, manner with the rotation angle, and in a substantially linear manner with distance from the rotation axis. Examples of such magnets are magnets having a cylindrical shape with a square, circular or polygonal cross-section.

It is an advantage that the angular position provided by such an arrangement is or can be robust for (e.g. is substantially insensitive to) position-offset errors. This offers the further advantage of not having to calibrate to compensate for position errors.

It is an advantage that the angular position provided by such an arrangement is or can be robust for (e.g. is substantially insensitive to) a uniform external magnetic field.

The magnetic source may be a multi-pole disc with circular shape, square shape or polygonal shape, e.g. hexagon. The multi-pole magnet may be, but does not need to be, provided with a central opening, for example a central cylindrical opening (thus basically forming an annulus).

The number of sensor elements is at least equal to the number of poles of the magnetic source, but may also be twice that number, for improved functionality.

In embodiments of the arrangement according to the present invention, the multi-pole magnet is a permanent magnet. The use of a permanent magnet for generating a magnetic field has the advantage that no power needs to be applied for generating the magnetic field.

In embodiments of the arrangement according to the present invention, the multi-pole magnet has a central cylindrical opening.

In embodiments of the arrangement according to the present invention, the multi-pole magnet has at least six magnetic poles.

It is an advantage of such an arrangement that it offers a higher sensitivity.

It is an advantage of an arrangement with a six-pole magnet, over magnets with more poles, that the angular range is 0 to 120°. The more magnet poles are available, the smaller the angular sensitivity range becomes.

In embodiments of the arrangement according to the present invention, the multi-pole magnet has a ring shape having an outer diameter and an inner diameter, and the circle in the sensor has a diameter of 1 to 30% of the outer diameter of the magnet.

It is an advantage of such arrangement that the diameter of the circle where the sensor elements are located, is substantially independent of the dimensions of the ring magnet. This allows the sensor and the magnet dimensions to be chosen substantially independent from each other. This also allows further technology scaling of the sensor independent of the magnet.

In embodiments of the arrangement according to the present invention, the measured at least one magnetic field component comprises a tangential field component of the magnetic field, oriented substantially tangential to the circle.

It is an advantage that such a tangential field originating from a multi-pole ring magnet or disk shape magnet provides a substantially sinusoidal signal in function of the angular distance between the stator and the rotor, and that the magnitude of the tangential field component varies in a substantially linear manner with distance from the rotation axis, offering excellent position-offset correction, and allowing scaling of the technology.

In embodiments of the arrangement according to the present invention, the sensor elements comprise vertical Hall effect elements having a plate with a normal that is tangential to the circle.

It is an advantage that such Hall elements are ideally suited for measuring (only) the tangential field component, while being insensitive to the axial or radial field components.

It is an advantage of using vertical Hall effect elements, because they are built in the depth direction of the semiconductor, e.g. silicon, substrate, and thus occupy less semiconductor area.

In embodiments of the arrangement according to the present invention, each sensing element comprises a pair of horizontal Hall effect elements located on the circle adjacent to each other, and having plates oriented substantially perpendicular to the rotation axis, and IMC segments for bending the local tangential magnetic field into a direction substantially perpendicular to the plates.

It is an advantage of such an arrangement that horizontal Hall elements can be used, which provide higher sensitivity and feature a smaller offset.

It is an advantage of using a horizontal Hall element in combination with IMC, in that the IMC provides for a signal amplification in a passive way.

In embodiments of the arrangement according to the present invention, the measured at least one magnetic field component comprises a radial field component of the magnetic field, oriented substantially radially to the circle.

It is an advantage that such a radial field originating from a multi-pole ring magnet or disk shape magnet provides a substantially sinusoidal signal in function of the angular distance between the stator and the rotor, and that the magnitude of the radial field component varies in a substantially linear manner with distance from the rotation axis, offering excellent position-offset correction, and allowing scaling of the technology. The radial field and tangential field offer the same advantages.

In such embodiments, the sensor elements may comprise vertical Hall effect elements having a plate with a normal that is perpendicular to and intersects with the rotation axis.

It is an advantage that such Hall elements are ideally suited for measuring (only) the radial field component, while being insensitive to the axial or tangential field components.

It is an advantage of using vertical Hall effect elements, because they are built in the depth direction of the semiconductor, e.g. silicon, substrate, and thus occupy less semiconductor area.

It is a further advantage of using vertical Hall elements in that no IMC is required.

In embodiments of the arrangement according to the present invention, the means for calculating is adapted for calculating the ratio of the first sum and the second sum or the ratio of the first average and the second average, and for determining the angular position of the rotor based on the arctangent or arccotangent of said ratio.

It is an advantage that the angular position can be calculated by relatively simple arithmetic. The goniometric function may be implemented by means of a look-up table, optionally with linear interpolation. The table may be stored in non-volatile memory.

In embodiments of the arrangement according to the present invention, the number of sensor elements is twice the number of magnetic poles of the multi-pole magnet. The sensor further comprises a third group and a fourth group of magnetic sensor elements located substantially on the circle, the magnetic sensor elements of the third and fourth group being oriented for detecting at least one magnetic field component. The sensor elements within each of the third and fourth group are located at equidistant angular positions on the circle, the angular distance between an element of the third group and an element of the first group being equal to $2 \times 180° = 360°$ divided by the number of magnet poles of the magnetic source, and the angular distance between an element of the fourth group and an element of the first group being equal to $3 \times 180° = 540°$ divided by the number of magnet poles of the magnetic source. The means for calculating is further adapted for calculating a third sum or third average of the signals provided by the elements of the third group, and for calculating a fourth sum or fourth average of the signals provided by the elements of the fourth group. The means for calculating is further adapted for determining the angular position of the rotor based on one or more numbers selected from the group consisting of the first sum, the first average, the second sum, the second average, the third sum, the third average, the fourth sum and the fourth average.

It is an advantage of this embodiment that it may provide redundancy, which can be used to further increase the accuracy by averaging tolerances of the components, e.g. non-idealities the magnet field, misalignment of the integrated circuit, tolerances within the integrated circuit, etc.

It is also an advantage of this embodiment that it can provide a reliable measurement, or can indicate an error, e.g. when the two measured angles deviate more than a given threshold value, as the case may be.

In embodiments of the arrangement according to the present invention, each sensor element comprises a horizontal Hall effect element, and the arrangement further comprises an integrated magnetic concentrator comprising a central part located on top of the horizontal Hall elements, and a plurality of elongated parts located at a distance from the Hall elements and oriented in radial directions.

In embodiments of the arrangement according to the present invention, each sensor element comprises a horizontal Hall effect element, and the arrangement further comprises an integrated magnetic concentrator comprising a central part, and a plurality of elongated parts each located on top of one of the Hall elements and oriented in radial directions.

In embodiments of the arrangement according to the present invention, the means for calculating is further adapted for calculating a first difference between the first sum and the third sum, and for calculating a second difference between the second sum and the fourth sum. The means for calculating is further adapted for calculating the ratio of the first difference and the second difference, and for determining the angular position of the rotor based on the arctangent or arc cotangent of said ratio.

It is an advantage that by using this particular algorithm, that the angular position provided by such an arrangement is additionally robust for (e.g. substantially insensitive to) a constant external field gradient, or in other words, insensitive to the zero and first order terms of a non-uniform external magnetic field. In this way, the magnetic field caused by a current carrying conductor can be considerably reduced. This advantage cannot be underestimated, especially in an automotive environment, in particular under the hood.

In a third aspect of the present invention, a use is provided of such an arrangement for calculating an angular position in an automotive environment.

It is particularly advantageous to use the proposed arrangement under the hood, where substantially large currents flowing in conductors may cause large disturbance fields, since the arrangement is highly insensitive to both the zero order term as well as the first order terms thereof.

In a fourth aspect of the present invention, a method is provided for determining an angular position of a rotor with respect to a stator using the arrangement as described above. The method comprises the steps of: calculating a first sum or a first average of the signals provided by the first group of sensor elements; calculating a second sum or second average of the signals provided by the second group of elements; determining the angular position of the rotor based on one or more numbers selected from the group consisting of the first sum, the first average, the second sum and the second average.

In embodiments of the method according to the present invention, the method further comprising the step of subtracting the signals of the elements of each pair so as to provide a combined signal for the calculation of the first resp. second sum or first resp. second average.

Each pair of horizontal Hall elements in this configuration provide in fact a single value.

In embodiments of the method according to the present invention, the method further comprises: calculating the ratio of the first sum and the second sum or the ratio of the first average and the second average; determining the angular position of the rotor based on the arctangent or arc cotangent of said ratio.

In embodiments of the method according to the present invention, the method further comprises: calculating a third sum or third average of the signals provided by the sensor elements of the third group, and for calculating a fourth sum or fourth average of the signals provided by the sensor elements of the fourth group; determining the angular position of the rotor based on one or more numbers selected from the group consisting of the first sum, the first average, the second sum, the second average, the third sum, the third average, the fourth sum and the fourth average.

In embodiments of the method according to the present invention, the method further comprises a step of calculating a first difference between the first sum and the third sum, and a second difference between the second sum and the fourth sum, and the ratio of the first difference and the second difference; and determining the angular position of the rotor based on the arctangent or arc cotangent of said ratio.

According to a fifth aspect, the present invention provides an integrated sensor circuit for measuring an angular position of a rotor with respect to a stator, the rotor being rotatable around a rotation axis and comprising a magnetic source mounted on the rotor for creating a magnetic field, the magnetic source being a multi-pole magnet having a number of magnetic poles for generating a periodically repetitive magnetic field pattern with respect to the rotation axis, the number of magnetic poles being at least four; the stator having a fixed position with respect to the rotation axis, the integrated sensor circuit being mountable to the stator in the vicinity of the multi-pole magnet and in line with the rotation axis in a plane substantially perpendicular to the rotation axis at a first distance from the magnetic source. The integrated sensor circuit comprises: a plurality of sensor elements, each sensor element being adapted for measuring at least one magnetic field component of the magnetic field and for providing a measurement signal indicative of the strength of the at least one magnetic field component at the location of the sensor element, the sensor elements being located substantially on a circle at a distance from the rotation axis, and being oriented for detecting the at least one magnetic field component; the plurality of sensor elements being partitioned in a first group and a second group, the elements within each group being located at equidistant angular positions on the circle, the angular distance between an element of the first group and an element of the second group being equal to 180° divided by the number of magnet poles of the magnetic source; means for calculating the angular position of the rotor from the provided signals; and wherein the means for calculating is adapted for calculating a first sum or first average of the signals provided by the elements of the first group, and for calculating a second sum or second average of the signals provided by the elements of the second group, and for determining the angular position of the rotor based on one or more number selected from the group consisting of the first sum, first average, the second sum and the second average.

It is an advantage of such an integrated circuit that it provides an accurate angular position, which is substantially insensitive or has a reduced sensitivity to an external magnetic field, and which is substantially insensitive or has a reduced sensitivity to positioning errors of the integrated circuit with respect to the rotation axis, while providing an improved sensitivity. This integrated circuit is ideally suited for measuring absolute angular positions in systems where the total angle is less than 360°, for example less than 180° in case a 4-pole magnet is used, or less than 120° in case a 6-pole magnet is used, etc. This may provide a more accurate positioning e.g. in applications like controlling a valve.

In embodiments of the integrated circuit according to the present invention, each sensor element comprises a vertical Hall effect element having a plate with a normal that is tangential to the circle.

In embodiments of the integrated circuit according to the present invention, each sensing element comprise a pair of horizontal Hall effect elements located on the circle adjacent to each other, and having plates oriented substantially perpendicular to the rotation axis, and IMC segments for bending the local tangential magnetic field into a direction substantially perpendicular to the plates.

In embodiments of the integrated circuit according to the present invention, each sensor element comprises a vertical Hall effect element having a plate with a normal that is perpendicular to and intersects with the rotation axis.

In embodiments of the integrated circuit according to the present invention, the means for calculating is further adapted for calculating the ratio of the first sum and the second sum or the ratio of the first average and the second average and for determining the angular position of the rotor based on the arctangent or arc cotangent of said ratio.

In embodiments of the integrated circuit according to the present invention, the number of sensor elements is twice the number of magnetic poles of the multi-pole magnet; and the integrated circuit further comprises a third group and a fourth group of magnetic sensor elements located substantially on the circle, the magnetic sensor elements of the third and fourth group being oriented for detecting at least one magnetic field component, the sensor elements within each of the third and fourth group being located at equidistant angular positions on the circle, the angular distance between an element of the third group and an element of the first group being equal to 2×180°=360° divided by the number of magnet poles of the magnetic source, and the angular distance between an element of the fourth group and an element of the first group being equal to 3×180°=540° divided by the number of magnet poles of the magnetic source; and the means for calculating is further adapted for calculating a third sum or third average of the signals provided by the elements of the third group, and for calculating a fourth sum or fourth average of the signals provided by the elements of the fourth group; and the means for calculating is further adapted for determining the angular position based on one or more numbers selected from the group consisting of the first sum, the first average, the second sum, the second average, the third sum, the third average, the fourth sum and the fourth average.

In embodiments of the integrated circuit according to the present invention, each sensor element comprises a horizontal Hall effect element, and the integrated circuit further comprises an integrated magnetic concentrator comprising a central part located on top of the horizontal Hall elements, and a plurality of elongated parts located at a distance from the Hall elements and oriented in radial directions.

In embodiments of the integrated circuit according to the present invention, each sensor element comprises a horizontal Hall effect element, and the integrated circuit further comprises an integrated magnetic concentrator comprising a central part and a plurality of elongated parts each located on top of one of the Hall elements and oriented in radial directions.

In embodiments of the integrated circuit according to the present invention, the means for calculating is further adapted for calculating a first difference between the first sum and the third sum, and for calculating a second difference between the second sum and the fourth sum; and the means for calculating is further adapted for calculating the ratio of the first difference and the second difference, and for determining the angular position of the rotor based on the arctangent or arc cotangent of said ratio.

In a sixth aspect of the present invention, a use is provided of such an integrated circuit for calculating an angular position in an automotive environment.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 6 also shows the position of sensor elements in a plane located at a distance from the magnet, and oriented perpendicular to the rotation axis.

Figure 1:
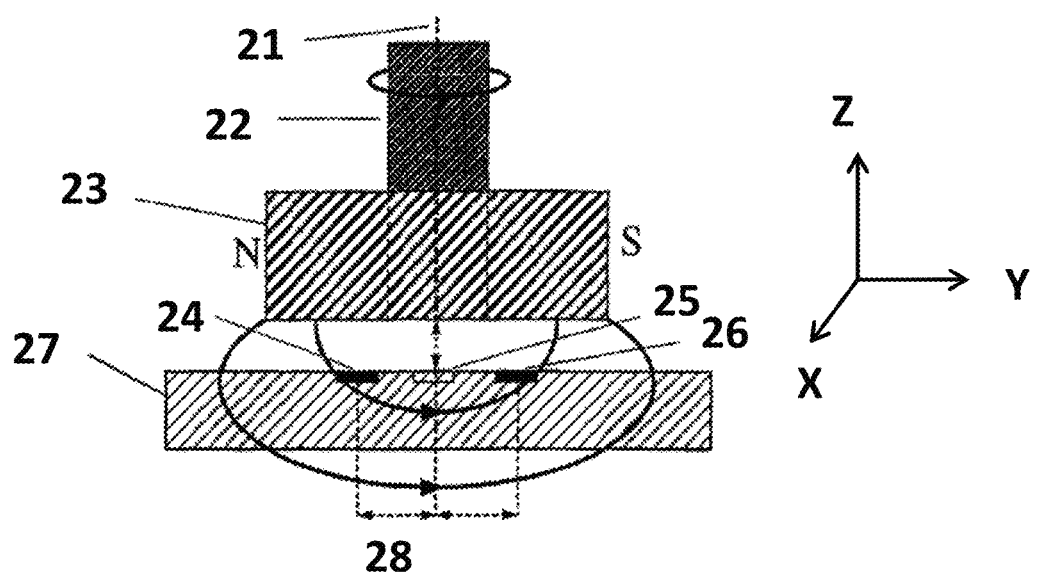
FIG. 1 shows a prior art arrangement for absolute angular position measurement using a two-pole bar magnet.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When reference is made to "external (unwanted) magnetic field", the magnetic field other than that caused by the "magnetic source" mounted to the rotor, e.g. a permanent magnet, is meant.

With a magnetic source having a "rotation symmetrical" field is meant that the magnetic field looks the same after the magnetic source is rotated around its axis with a angle smaller than 360°, e.g. 180° for a four-pole ring magnet or disk magnet, or 120° for a six-pole ring magnet or disk magnet, etc.

With a uniform external field is meant a field with a constant amplitude and a constant direction. Such a field can be described as a constant vector (Bxo, Byo, Bzo).

FIG. 1 shows a prior art arrangement for absolute angular position measurement using a two-pole bar magnet, as described in EP0916074B1. The arrangement has a rotor 22 rotating around a rotation axis 21 with respect to a stator 27. A bar magnet 23 is mounted to the rotor 22 for creating a magnetic field, some flux-lines of which are shown. At a distance "below" the magnet (z-direction), a sensor is located, the sensor having four sensor elements 24, 25, 26, three of which are shown. The sensor elements are Hall elements for sensing an axial field component $B_\perp$ of the magnetic field, e.g. field lines oriented in the vertical Z direction, in parallel to the rotation axis. It is explicitly mentioned in the description and the claims of EP0916074B1, that the sensor elements are to be organized in at least two sensor pairs, or to increase accuracy in multiple pairs, and that the magnetic field has no rotational symmetry relative to the rotation axis.

Figure 2:
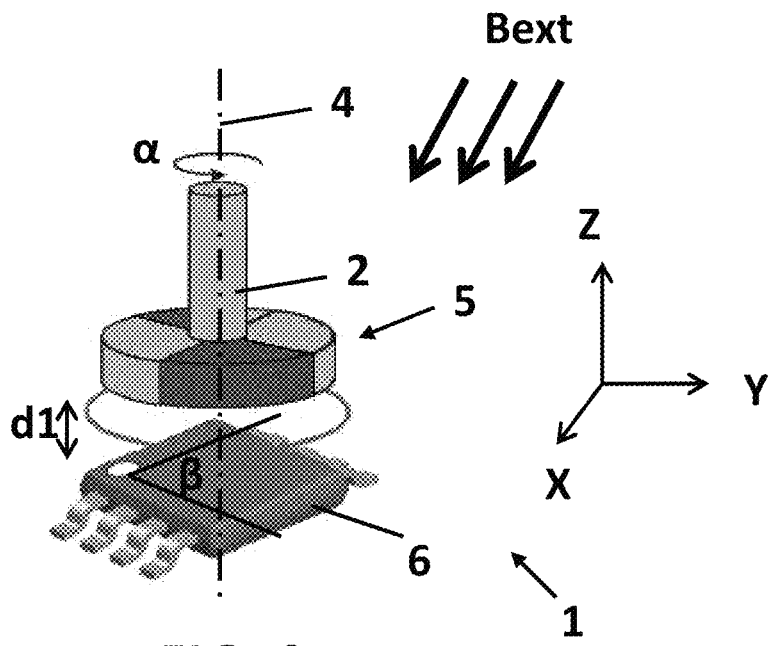
FIG. 2 shows an arrangement for absolute angular position measurement according to embodiments of the present invention, using a four-pole magnet. A constant external field is also shown.

FIG. 2 shows an arrangement 1 comprising a sensor 6, in this case an integrated circuit, for absolute angular position measurement of the rotor 2 with respect to a stator (not shown), whereto the sensor 6 is fixedly mounted. The rotor 2 is rotatable around a rotation axis 4, and comprises a multi-pole magnet 5 having at least four magnetic poles, Np=4, in this case a permanent disk-magnet having four poles (indicated in light grey and dark grey). This magnet 5 creates, at a predetermined distance, or in a predetermined distance range, a periodically repetitive flux density pattern, e.g. a sinusoidal flux density pattern, of at least one of the three cylindrical components (radial, tangential, axial) of the magnetic field. The magnetic field is rotation symmetric with respect to the rotation axis 4, and repeats itself with a period of 180°, in this example. This implies that the angle sensor can only measure mechanical angles in the range of 0° to 180°. For a six-pole magnet, the measurable range is 0° to 120°, etc.

The sensor 6 is arranged at a distance d1 "below" the magnet 5, and is located substantially in line with the rotation axis 4, and is located in a plane β substantially perpendicular to the rotation axis 4. The sensor 6 comprises at least four sensor elements located in a plane β substantially perpendicular to the rotation axis 4, for measuring one or more magnetic field components Br, Bt, Bz, and means for calculating the angular position α of the rotor 2 from the signals provided by those sensor elements, as will be described further. In embodiments of the present invention, the distance d1 is between zero and the outer diameter of the magnet 5. In particular embodiments, the distance d1 may be selected to be between 10 and 30% of the outer magnet diameter. If the magnet is not circular shaped, the diameter may be the diameter of a circumscribing circle. Alternatively, for non-circular shaper magnets, the distance d1 may be between zero and the side length of the magnet, the side length being the length of the largest side of the magnet.

Figure 3:
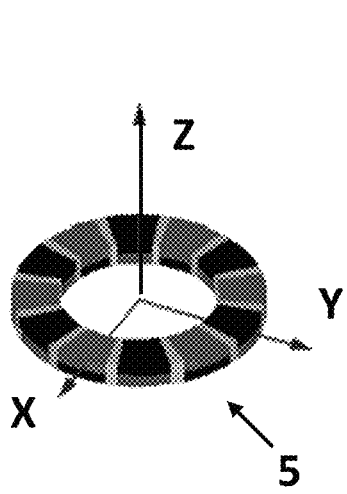
FIG. 3 shows an axially magnetized ring-magnet with twelve poles and with a central cylindrical opening, as can be used in embodiments of the present invention.
Figure 4:
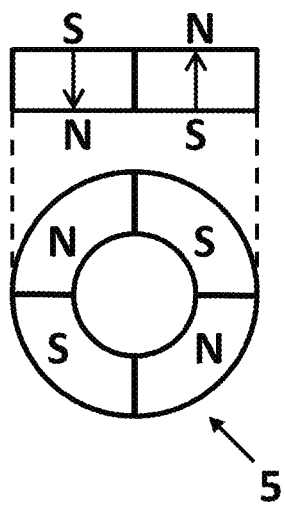
FIG. 4 shows an axially magnetized ring-magnet with four poles, and with a central cylindrical opening, as can be used in embodiments of the present invention.
Figure 5:
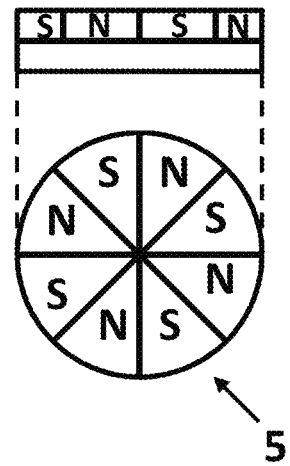
FIG. 5 shows a disk magnet without a central opening, having a surface magnetization forming four pole pairs (eight poles), as can be used in embodiments of the present invention.

FIG. 3 to FIG. 5 show just a few examples of types of multi-pole magnets 5 that can be used with the sensor 6 of FIG. 2, but many more types may be used, as long as the magnet 5 is a multi-pole magnet having at least four poles (North and South poles), for creating a rotation-symmetrical magnetic field B around the rotation axis 4, the field having tangential and/or radial and/or axial field components Bt, Br, Bz respectively, which, when measured on an imaginary circle having a center at the rotation axis 4, and located at a distance d1 from the magnet, varies in a substantially sinusoidal or cosinusoidal way with the angle α, and which preferably also varies in a substantially linear, e.g. in a linear way from the centre of the imaginary circle, to a certain radius value. The latter will be illustrated further in FIGS. 13 to 15.

FIG. 3 shows an axially magnetized ring-magnet with twelve poles (six pole pairs) and with a central cylindrical opening, as can be used in embodiments of the present invention. It is to be noted that the number of poles, twelve in the embodiment illustrated, is just an example, and ring magnets having four poles (see FIG. 4), six poles (see FIG. 16 and FIG. 20), eight pole (see FIG. 5), ten poles, or even more, in general 2k poles, k being an integer larger than 1, may also be used in accordance with embodiments of the present invention. However, the maximum angle α that can be measured decreases as the number of poles increases, according to the formula: 720°/Np, whereby Np is the number of poles.

FIG. 5 shows a disk magnet 5 without a central opening, and having a surface magnetization (in the example shown, the top surface). However, as can be appreciated when drawing field lines (not shown) from each N-pole to the neighboring S-pole, this magnet indeed creates such a magnetic field with a tangential field component satisfying the above characteristics. As can be appreciated from comparing FIG. 3, FIG. 4 and FIG. 5, a central opening in the magnet is not required; the magnet can also be a disk magnet. In yet alternative embodiments, the magnet does not need to have a circular shape: it can have a square shape or a polygon shape. The magnet may even have slots. An important feature of the magnet is the repetitive flux field, e.g. sinusoidal with a period of 720°/Np, Np being the number of poles of the magnet, of the radial Br and/or tangential Bt and/or axial Bz field component under rotation.

In what follows, it will be assumed that the magnet 5 is a multi-pole ring magnet, but as already explained, the invention is not limited to ring magnets.

Figure 6:
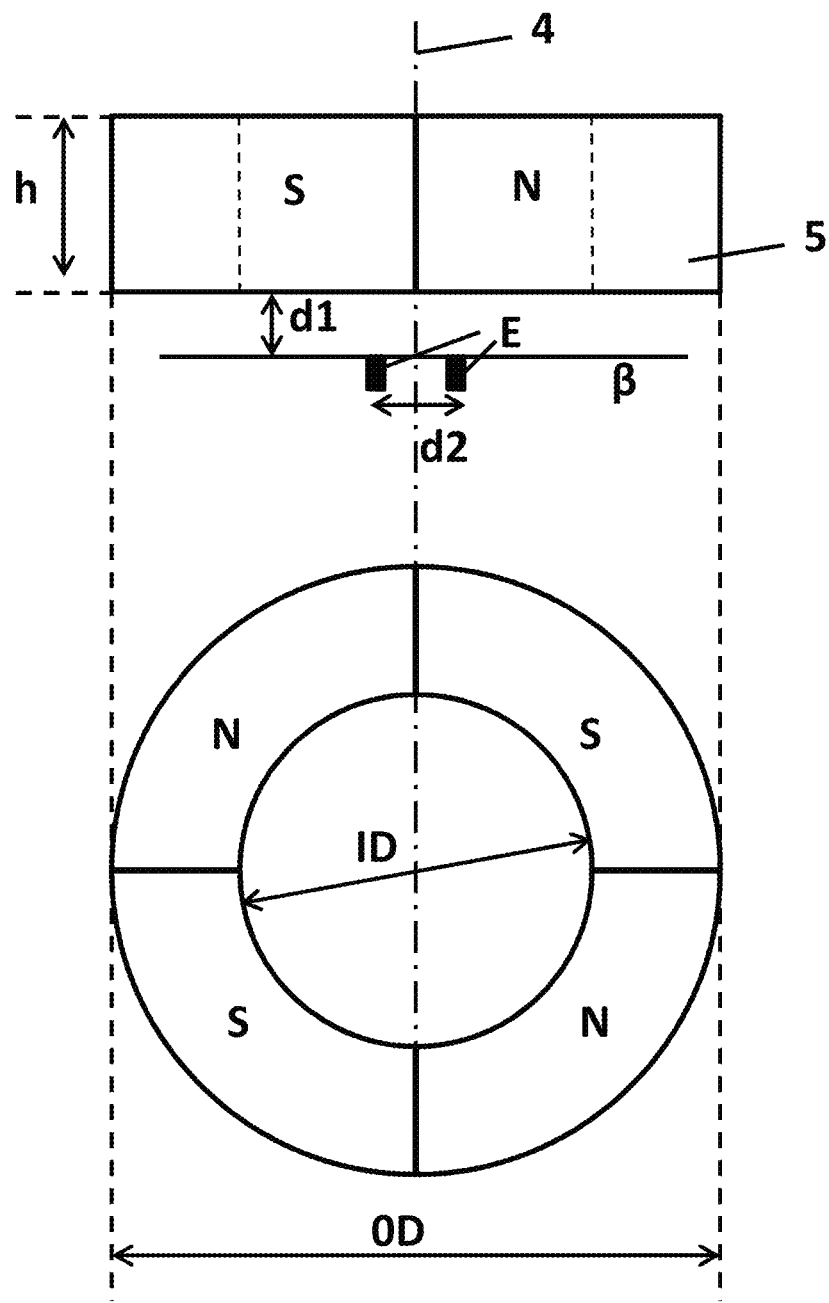
FIG. 6 shows an example of a multi-pole ring-magnet with a central opening, and having two pole-pairs, shown in top-view (bottom of FIG. 6) and shown in side-view (top of FIG. 6).

FIG. 6 shows an embodiment of a four-pole ring-magnet with a central opening, and having four poles (two North poles, and two South poles), shown in top-view (lower part of FIG. 6) and shown in side-view (upper part of FIG. 6). In a specific example, the ring magnet 5 may have an outer diameter OD of about 12 mm, an inner diameter ID of about 8 mm, and a height h of about 4 mm, but the invention is not limited thereto. The position of the sensor elements relative to the magnet is also shown, albeit not on scale, for illustrative purposes. The sensor elements E are located substantially at a distance d1 from the flat bottom surface of the magnet 5, and are located substantially on an imaginary circle (not shown) located in a plane β perpendicular to the rotation axis 4, having a center point on the rotation axis 4 and having a diameter d2. This example will be described in detail. The skilled person can then perform the same tests, simulations or measurements for other magnet types, or dimensions.

First Algorithm

Figure 7:
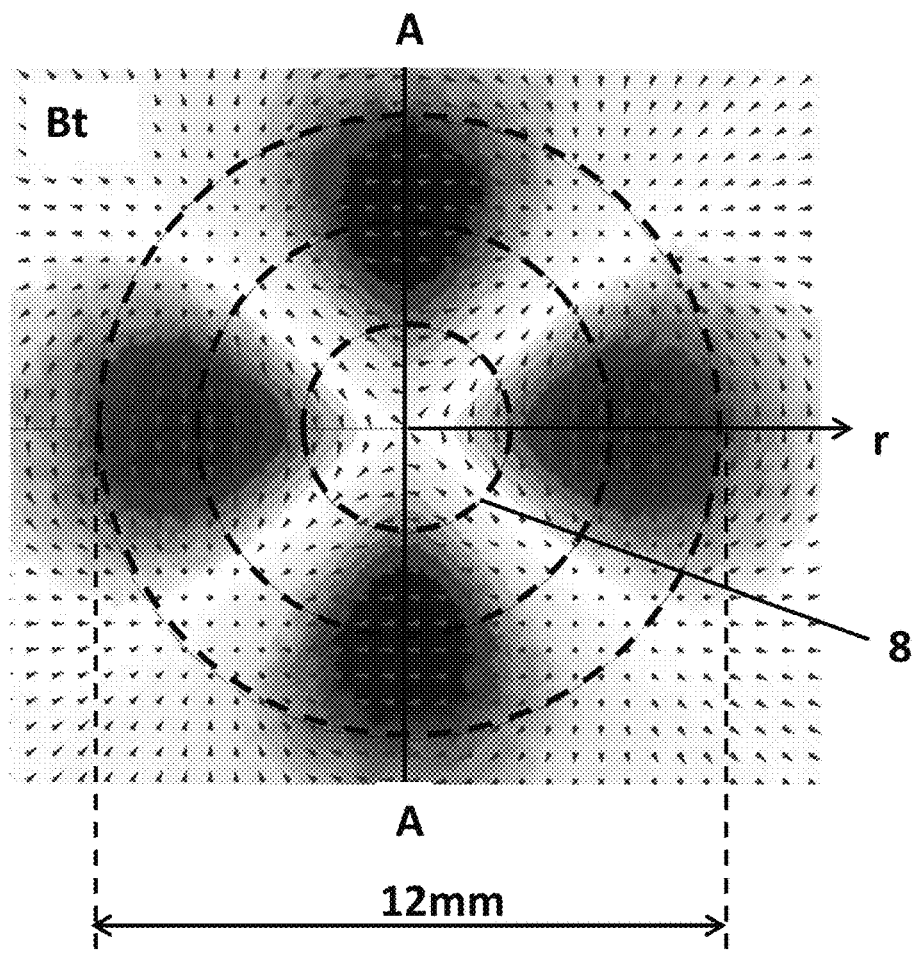
FIG. 7 shows a simulation of the tangential field component of the four-pole ring magnet of FIG. 6 at a distance of 3 mm below the magnet surface. The outer and middle circles correspond to the outer resp. inner diameter of the ring magnet. The inner circle corresponds to an imaginary circle where the sensor elements could be placed.

FIG. 7 shows simulation results of the tangential magnetic field component Bt of the magnetic field created by the four pole ring magnet of FIG. 6, measured at a distance d1 of 3 mm below the magnet surface. The simulation results are obtained by a 3D magnetic simulation with a finite element simulation tool. On top of the simulation result, three circles are drawn, the outer circle and middle circles correspond to the outer resp. inner diameter of the ring magnet 5 (in the example having a diameter of 12 and 8 mm respectively). The inner circle 8 represents an example of an imaginary circle 8 where the sensor elements could be placed. It is to be noted that in the prior art, ring magnets are used for pulse encoding (e.g. counting the integer number of pole occurrences, not fractions thereof), but as far as known to the inventor, the sensor is then always located under or outside of the ring magnet, never "on the inside" of the ring (i.e. at a radial distance smaller than the inner diameter of the magnet), despite the fact that the magnetic field component is the largest between the middle and outer circle (in the example the circles having a diameter of 8 and 12 mm respectively). In addition, it is counter-intuitive to believe that the field lines behave in a linear way near the centre of the ring, let alone at an axial distance d1 therefrom. It is to be noted that this magnetic field can be generated by a single magnet 5, and that no ferromagnetic yokes or the like are required (see also FIG. 6). This decreases component cost and manufacturing cost, and decreases the risk for misalignments.

Figure 8:
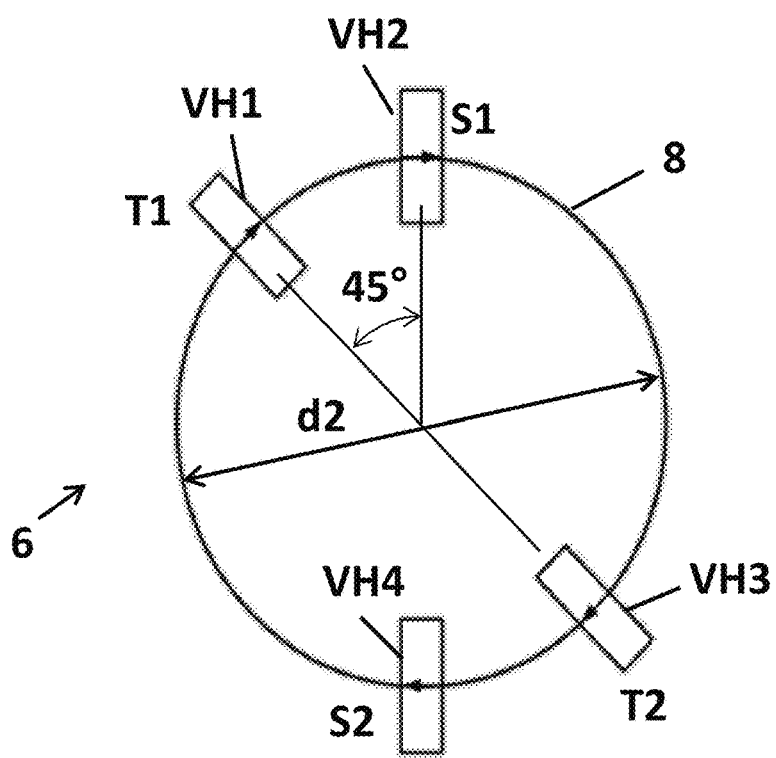
FIG. 8 shows an example of the position and orientation of four vertical Hall sensor elements, lying on the imaginary circle, and oriented for measuring the tangential magnetic field component of FIG. 7.

FIG. 8 shows a first embodiment of a sensor having four sensor elements VH1-VH4, in this case vertical Hall sensor elements, oriented for measuring a tangential field Bt to the imaginary circle 8. In this example, the sensor elements are arranged in two groups: a first group S consisting of the sensor elements VH2 and VH4, and a second group T consisting of the sensor elements VH1 and VH3. The sensor elements VH2, VH4 of the first group S provide the signals S1, S2 respectively. The sensor elements VH1, VH3 of the second group T provide the signals T1, T2 respectively. The signals S1 and S2 of the first group are added (not subtracted as in EP0916074B1) to form a first sum sum1, the signals T1 and T2 of the second group are added to form a second sum sum2:

$$\text{sum1} = S1 + S2; \tag{1}$$

$$\text{sum2} = T1 + T2; \tag{2}$$

The sensor elements within each group S, T are located equidistantly, e.g. at an angular distance of 720°/Np=e.g. 180° apart for a four-pole magnet, e.g. VH1 and VH3 are located 180° apart, as well as VH2 and VH4.

The angular distance between an element VH2 of the first group S and an element VH1 of the second group T is equal to 180° divided by the number Np of magnetic poles of the magnetic source 5, e.g. the angular distance between VH2 and VH1 is 180°/4=45°.

By positioning the sensor elements VH1 and VH3 at 180° apart, and the sensor elements VH2 and VH4 180° apart (in general 720°/Np, where Np is the number of poles, in the example Np=4), and a sensor element VH2 of the first group S at an angular distance of 180°/Np=45° with respect to an element VH1 of the second group T, the value of sum1 varies like a sine function of the number of pole pares multiplied by the position angle of the rotor 2, e.g. twice the position angle of the rotor 2, i.e. $2\alpha$ in case of four poles as in the example illustrated, or $3\alpha$ in case of a six-pole magnet, and the value of sum2 varies as a cosine function of the number of pole pares multiplied by the position angle of the rotor 2, e.g. $2\alpha$ in case of a four-pole magnet, or $3\alpha$ in case of a six-pole magnet, apart from a predefined offset, which can be determined during manufacturing, or can be measured during calibration, and is not taken into account further. One can then calculate a ratio R as (for the example illustrated):

$$R = \text{sum1}/\text{sum2} = \tan(2\alpha) \quad (3)$$

and the angle $\alpha$ can then be calculated as:

$$\alpha = (\arctan R)/2. \quad (4a)$$

Alternatively, the angle $\alpha$ may also be calculated as:

$$\alpha = (\text{arccotan} (\text{sum2}/\text{sum1}))/2 \quad (4b)$$

or by using equivalent formulas.

It is to be noted that instead of calculating the sum of the values of each group S, T, one could also calculate the average value of each group, and calculate the ratio of the first average avg1 and the second average avg2, etc, which would yield the same result for the angular position a, since the average is sum divided by 2, and thus the ratio R would remain unchanged.

The configuration of FIG. 8 is substantially insensitive (or at least has a reduced sensitivity) to position-offset errors of the sensor 6 with respect to the axis of rotation 4, because the signals T1 and T2 generated by VH1 and VH3 (at least partially) compensate each other: if one signal is larger due to radial position offset, the other is smaller, preferably by the same amount. The same applies for the signals S1 and S2 provided by the sensors VH2 and VH4. For offset along the axis of rotation 4, hence in the z-direction, both sums (S1+S2) and (T1+T2) will be increasing or decreasing by the same factor, so that the ratio between them which is used for the angle calculation is not affected.

The configuration of FIG. 8 is also insensitive to a uniform external magnetic field Bext (see FIG. 2), because the values measured by the sensors in each group, cancel each other when being added, since the sensor elements VH1 and VH3 on the one hand, and VH2 and VH4 on the other hand, are oriented in opposite directions. Due to the fact that a ratio R is taken of the sum or average of the field components, the absolute value of the magnetic field components is irrelevant, only their relative values matter. This means that the method is highly robust against ageing, tolerances on magnets, and temperature. Since for a four-pole magnet, the sine and cosine functions vary with $2\alpha$ instead of $\alpha$, $\alpha$ being the mechanical angle over which the rotor is rotated w.r.t. the stator, the sensor 6 with the four-pole magnet has a higher sensitivity than the sensor of the prior art, despite the fact that it has the same number of sensor elements. On the other hand, the angular position range which can be measured by the sensor is 180°. The sensing elements VHi, i=1 to 4 of FIG. 8 are considered to be located in a single plane $\beta$ (see FIG. 2), even though the "Hall plates" of the sensor elements VHi would actually be built in the depth direction of the substrate. However, as the centers of the Hall plates are located on the imaginary circle 8, and as the relative dimensions of the Hall plates are much smaller (e.g. a factor 10 or more) than the diameter of the imaginary circle 8, the sensor elements can be considered as being located in the plane $\beta$, without taking the "height" as measured in the axial direction Z into account.

Figure 9:
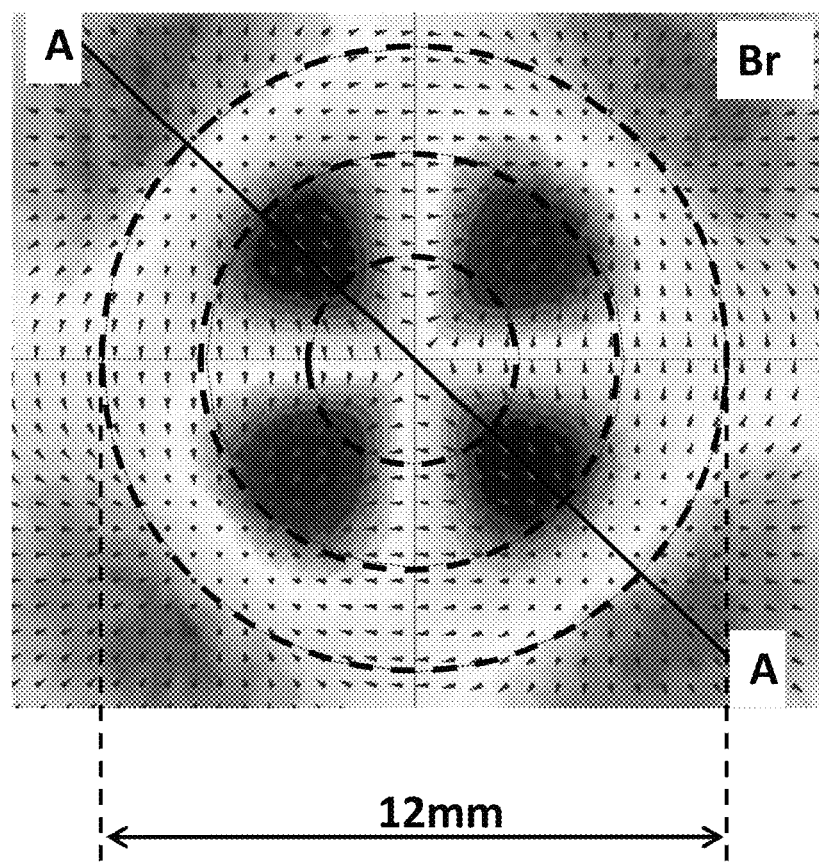
FIG. 9 shows a simulation of the radial field component of the four-pole ring magnet of FIG. 6 at a distance of 3 mm below the magnet surface. The same rings as in FIG. 7 are shown.

FIG. 9 shows simulation results (using the same tool and parameters as for FIG. 7) of the radial magnetic field component Br of the magnetic field B created by the four-pole ring magnet of FIG. 6, measured at a distance d1 of about 3 mm below the magnet surface. On top of the simulation result, the same three circles are drawn as shown in FIG. 7. It is to be noted that this magnetic field is generated by a single magnet 5, and that no ferromagnetic yokes or the like are required (see also FIG. 6). This decreases component cost and manufacturing cost, and decreases the risk for misalignments.

Figure 10:
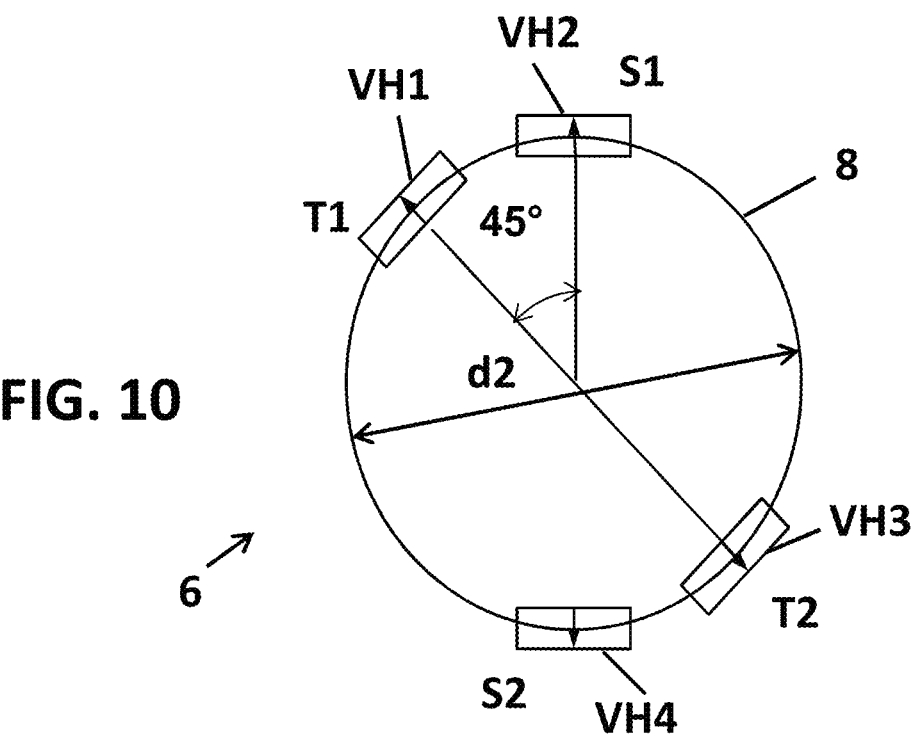
FIG. 10 shows an example of the position and orientation of four vertical Hall sensor elements of a sensor according to embodiments of the present invention, the elements lying on an imaginary circle, and oriented for measuring the radial magnetic field component of FIG. 9.

FIG. 10 shows a second embodiment of a sensor having four sensor elements VHi, i=1 to 4, in this case vertical Hall sensor elements, oriented for measuring a radial field on the imaginary circle 8. The sensor elements are again arranged in two groups: a first group S consisting of the sensor elements VH2 and VH4, and a second group T consisting of the sensor elements VH1 and VH3. The sensor elements VH2, VH4 of the first group S provide the signals S1, S2 respectively. The sensor elements VH1, VH3 of the second group T provide the signals T1, T2 respectively. The signals S1 and S2 of the first group are added (not subtracted as in EP0916074B1) to form a first sum sum1, the signals T1 and T2 of the second group are added to form a second sum sum2.

$$\text{sum1} = S1 + S2; \quad (5)$$

$$\text{sum2} = T1 + T2; \quad (6)$$

By positioning the sensor elements VH1 and VH3 at 180° apart, and the sensor elements VH2 and VH4 180° apart (in general 720°/Np, where Np is the number of poles, in the example Np=4), and a sensor element VH2 of the first group S at an angular distance of 180°/Np=45° with respect to an element VH1 of the second group T, the value of sum1 varies, in the 4-pole embodiment illustrated, like a sine function of twice the position angle of the rotor 2, i.e. $2\alpha$, and the value of sum2 varies as a cosine function of $2\alpha$, apart from a predefined offset.

One can then calculate a ratio R as:

$$R = \text{sum1}/\text{sum2} = \tan(2\alpha) \quad (7)$$

and the angle $\alpha$ can then be calculated as:

$$\alpha = (\arctan R)/2 \quad (8)$$

As mentioned above, the angle $\alpha$ may also be calculated using the arccotan function.

It is to be noted that instead of calculating the sum of the values of a group, one could also calculate the average value of each group S, T, calculate the ratio R of the averages, etc, which would yield the same result for the angular position $\alpha$, since the average is sum divided by 2, and thus the ratio R would remain unchanged.

The configuration of FIG. 10 is substantially insensitive to position-offset errors of the sensor 6 w.r.t. the magnet 5, because the signals S1, S2 generated by VH2 and VH4 compensate each other when being added: if one signal is larger due to radial position offset, the other is smaller, preferably by the same amount. The same applies for VH1 and VH3. The configuration of FIG. 10 is also insensitive to a uniform (e.g. constant) external magnetic field Bext, because the values measured by the sensors in each group cancel each other (since the sensor elements are oriented in opposite directions). Due to the fact that a ratio is taken of the sum or average of the field components, the absolute value of the magnetic field components is irrelevant, only their relative values. This means that the method is highly robust against ageing, tolerances on magnets, and temperature.

Figure 11:
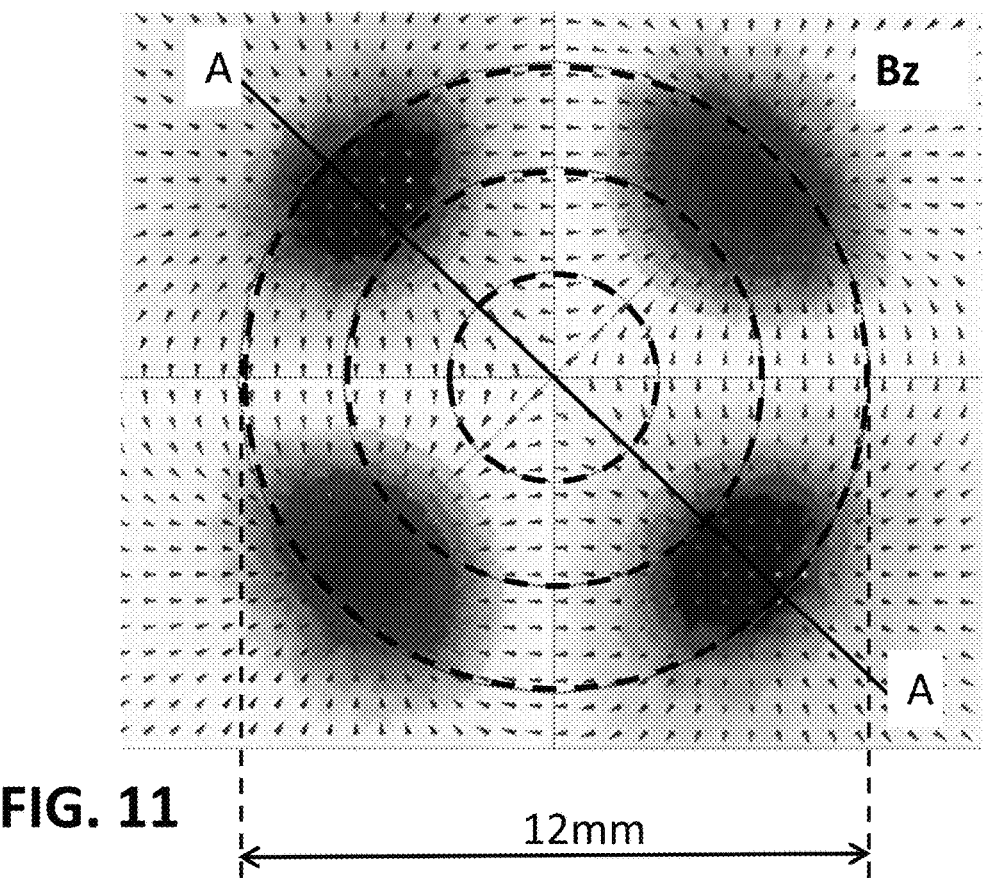
FIG. 11 shows a simulation of the axial field component of the four-pole ring magnet of FIG. 6 at a distance of 3 mm below the magnet surface. The same rings as in FIG. 7 are shown.

FIG. 11 shows simulation results of the axial field component Bz of the magnet of FIG. 6 at a distance of 3 mm below the magnet surface. The same rings as in FIG. 7 are shown. At first sight the field looks much like the tangential field shown in FIG. 7 or the radial field shown in FIG. 9, but there is a slight disadvantage, which will be described in relation to FIG. 12.

Figure 12:
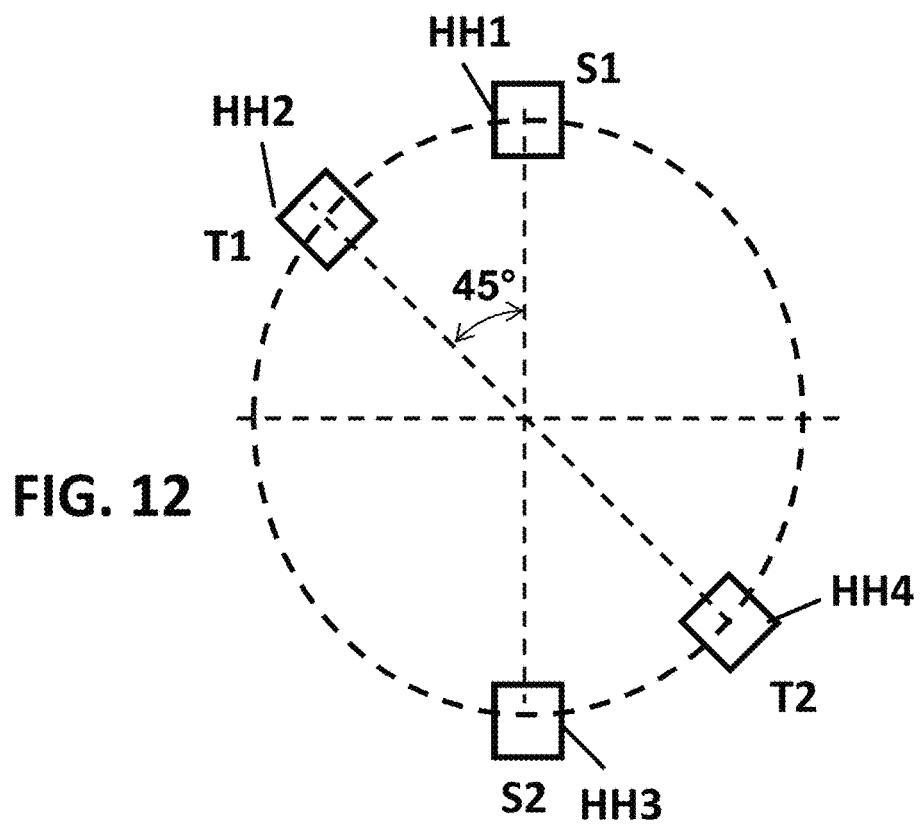
FIG. 12 shows an example of the position and orientation of four horizontal Hall sensor elements of a sensor according to embodiments of the present invention, the elements lying on an imaginary circle, and oriented for measuring the axial magnetic field component of FIG. 11.

FIG. 12 shows a third embodiment of a sensor having four sensor elements HH1 to HH4, in this case horizontal Hall sensor elements, oriented for measuring an axial field on the imaginary circle 8. The sensor elements are again arranged in two groups: a first group S consisting of the sensor elements HH1 and HH3, and a second group T consisting of the sensor elements HH2 and HH4. It is to be noted that all sensor elements of a same group S or T which are in this embodiment located 720°/4=180° apart, e.g. the elements HH1 and HH3 of the first group S or HH2 and HH4, are oriented such that thay generate a value with the same sign for the same field direction (e.g. positive for field into the plane). The groups S, T are independent from one another, so both groups can have the same orientation or can have a different orientation.

The sensor elements HH1, HH3 of the first group S provide the signals S1, S2 respectively. The sensor elements HH2, HH4 of the second group T provide the signals T1, T2 respectively. The signals S1 and S2 of the first group are added (not subtracted as in EP0916074B1) to form a first sum1, the signals T1 and T2 of the second group are added to form a second sum2.

$$sum1 = S1 + S2; \quad (9)$$

$$sum2 = T1 + T2; \quad (10)$$

By positioning the sensor elements HH1 and HH3 at equidistant angular positions, e.g. 180° apart, and the sensor elements HH2 and HH4 180° apart (in general 720°/Np, where Np is the number of poles, in the example Np=4), and a sensor element HH1 of the first group S at an angular distance of 180°/Np=45° with respect to an element HH2 of the second group T, the value of sum1 varies like a sine function of twice the position angle of the rotor 2, i.e. $2\alpha$, and the value of sum2 varies as a cosine function of $2\alpha$, apart from a predefined offset.

One can then calculate a ratio R as:

$$R = sum1/sum2 = \tan(2\alpha) \quad (11)$$

and the angle $\alpha$ can then be calculated as:

$$\alpha = (\arctan R)/2 \quad (12)$$

As mentioned above, the angle $\alpha$ may also be calculated using the arccotan function.

It is to be noted that instead of calculating the sum of the values of a group, one could also calculate the average value of each group, and the ratio of the averages, etc, which would yield a similar result. The configuration of FIG. 12 is somewhat sensitive to position-offset errors of the sensor 6 w.r.t. the magnet 5, as will be explained in relation to FIG. 13. Due to the fact that a ratio is taken of the sum or average of the field components, the absolute value of the magnetic field components is irrelevant, only their relative values count. This means that the method is highly robust against ageing, tolerances on magnets, and temperature. A drawback of this embodiment, however, is that the configuration of FIG. 12 is very sensitive to a uniform (e.g. constant) external magnetic field Bext, because the values measured by the sensors in each group do not cancel each other out (since the sensor elements are oriented in the same direction). However, since there are only horizontal Hall elements used, they are only sensitive to on external Bz field, not to Bx, By.

By means of FIG. 7 to FIG. 12 it is explained that an arrangement comprising a four-pole ring magnet and four sensor-elements, arranged on an imaginary circle, and oriented for measuring one field component Br, Bt, Bz, whereby the sensor elements are partitioned in two groups S, T, whereby the elements of each group S, T are oriented in opposite directions (in case of Br and Bt) or in the same direction (in case of Bt), and whereby the elements in each group are located at equidistant positions, and the positions of the groups are 45° apart, can be used to determine the angular position of the sensor with respect to the magnet, by calculating the arctangent or arccotangent of the ratio R of the sum, or average of the signals of the elements of each group.

The position error sensitivity of these sensors, in particular the radial position sensitivity, will be described next, in relation to FIG. 13 to FIG. 15.

Figure 13:
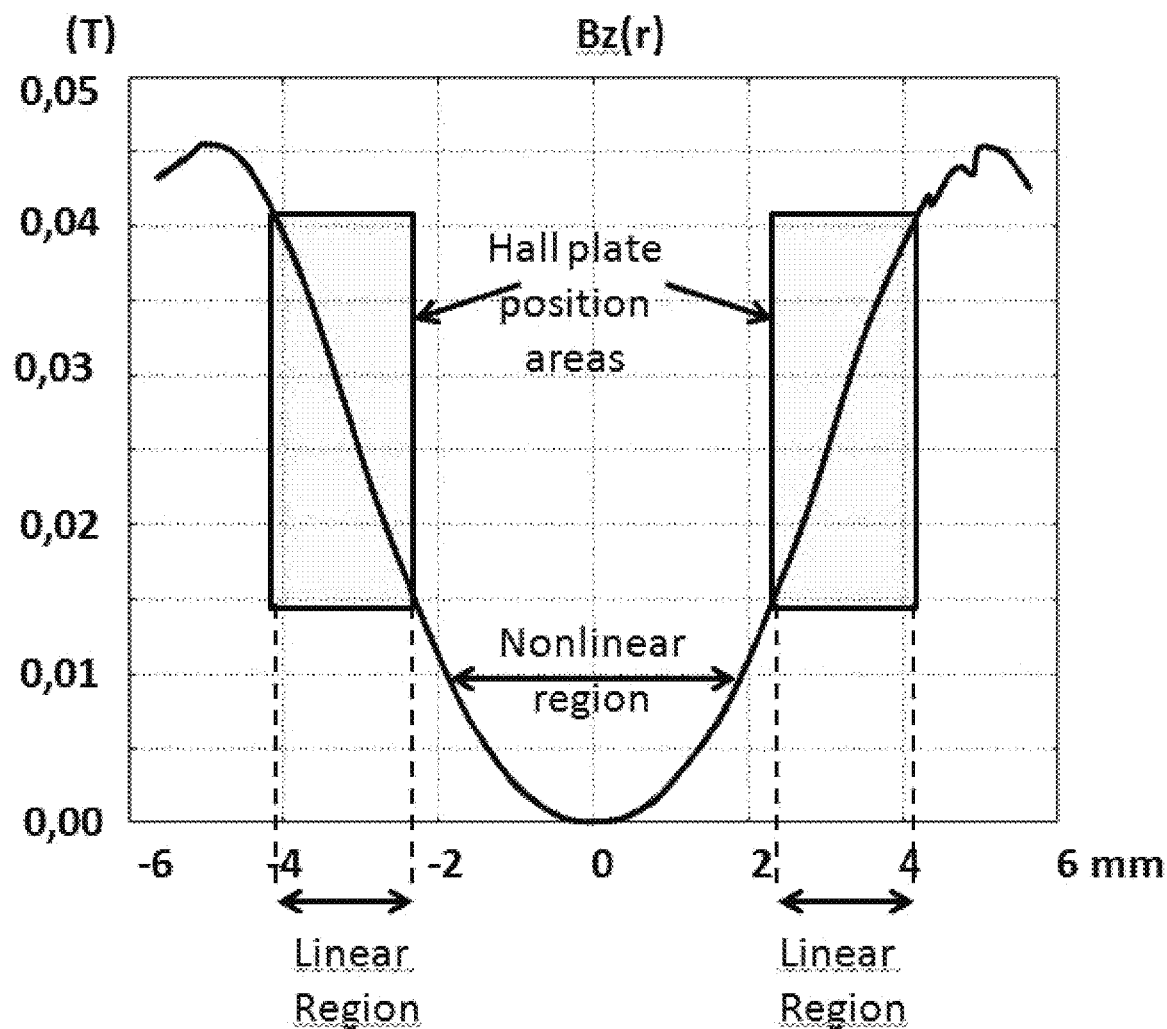
FIG. 13 shows the strength of the axial magnetic field component of FIG. 11 in function of radius.

FIG. 13 shows the strength of the axial magnetic field component Bz of FIG. 11, measured on the line A-A, in function of the radius r. The vertical axis shows the magnetic flux density (in T). As shown, the field behaves in a very non-linear way near the centre, and behaves in a linear manner in a region from about 2.0 to about 4.0 mm from the centre, where the field strength ranges from about 15 to 40 mT. In order to place the sensor elements HH1 to HH4 of FIG. 12 such that they are highly insensitive to position-offset, the sensor elements would have to be located in these linear regions, e.g. the imaginary circle would need to have a diameter of about 4 to 8 mm. However, this limits the down-scaling of sensor-technology (e.g. CMOS-technology), and prohibits that the sensor dimensions can be chosen independently from the magnet-dimensions, due to the relation between the magnet dimensions, and the position of the linear regions. Despite of not being perfect in relation to position-offset-error, the sensor of FIG. 12, even if the diameter of the imaginary circle would be chosen in the "non-linear" region (e.g. less than 4 mm in the embodiment illustrated), would still be able to measure the angular position, in the absence of an external magnetic field, e.g. when being shielded. Furthermore, it is mentioned that the function Bz(r) is "nearly" linear at a distance of about 1 mm to about 2 mm from the center, which deviation may well be acceptable in most applications. And even within the range of 0 mm to 1 mm, the slope of the curve is negative on the left of the center, and positive on the right, thus there is always at least a partial compensation against offset error.

Figure 14:
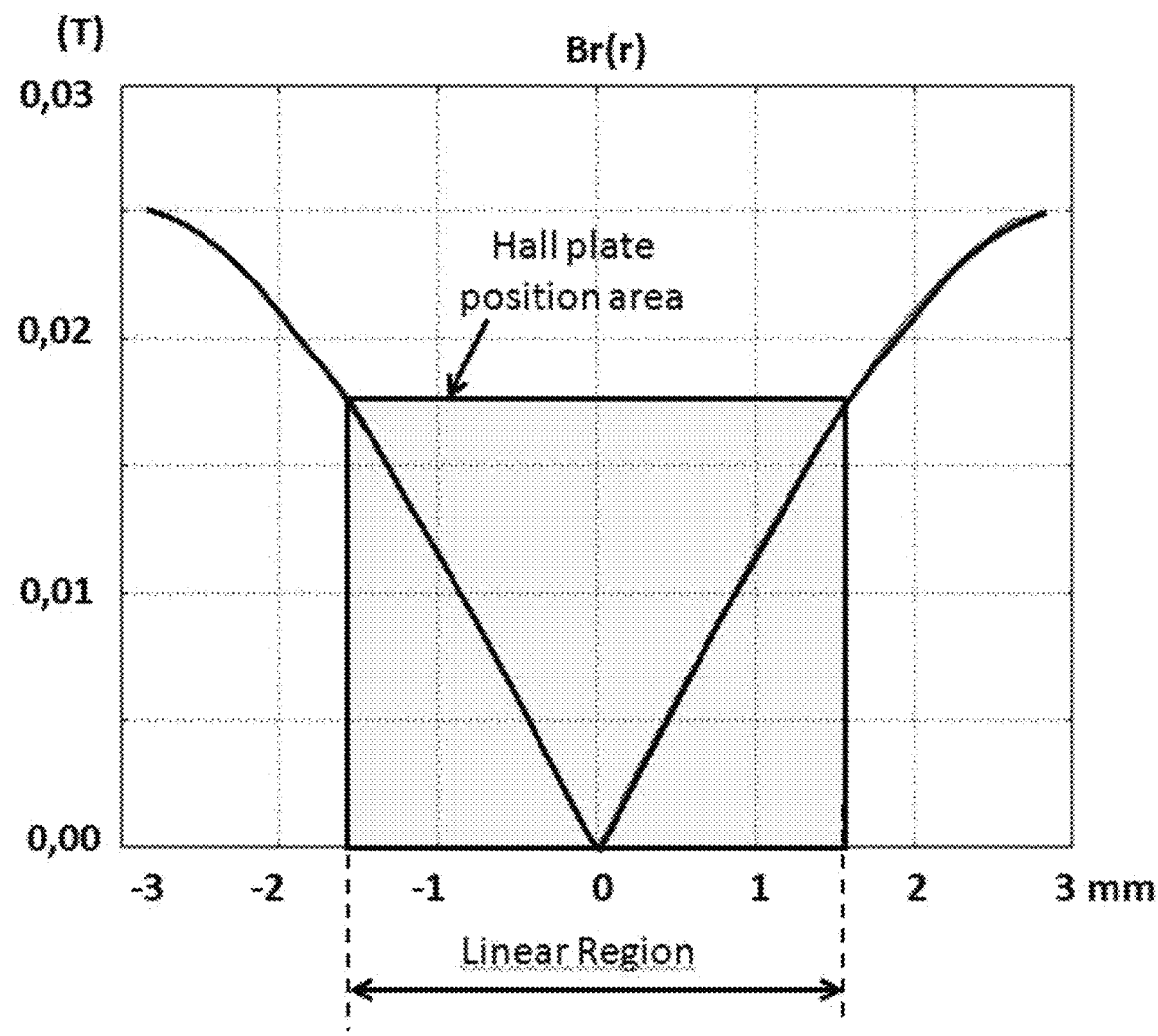
FIG. 14 shows the strength of the radial magnetic field component of FIG. 9 in function of radius.

FIG. 14 shows a similar drawing for the strength of the radial magnetic field component Br of FIG. 9 in function of radius, measured on the line A-A. It is to be noted that a smaller portion is drawn (from −3 to +3 mm). As can be seen, the field strength Br(r) is highly linear near the center, the linear range extends from about −1.5 to about +1.5 mm, and the field strength Br ranges from 0 mT to about 17 mT. When the sensor elements are located in the area indicated by the grey rectangle, sensor elements of each group will compensate or cancel position offset. Since this rectangle includes the center, the distance d2 between the sensor elements can be made as small as desired, thus the die size of an integrated circuit has no impact on the position error (also known as "off-axis error"), and can be chosen independently from the magnet dimensions. Suitable diameters d2 for the imaginary circle 8 of a sensor for measuring this field component Br would be any diameter between 0.0 (not included, but the diameter can go down to a few microns) and 3.0 mm, in practice from 0.1 to 3.0 mm, e.g. about 0.5 mm, about 1.0 mm, about 1.5 mm, about 2.0 mm, or about 2.5 mm, or any values in between. The smaller the distance between two opposite sensor elements, the smaller the signal. So the optimum would be as large as possible within the linear range for a typical semiconductor, e.g. silicon, die between 1 and 10 mm². Practically the ring diameter is then between 1 and 3 mm. However, if a diameter d2 of 1.0 mm is chosen, the maximum position offset which can be compensated is 0.5 mm, half the diameter.

Figure 15:
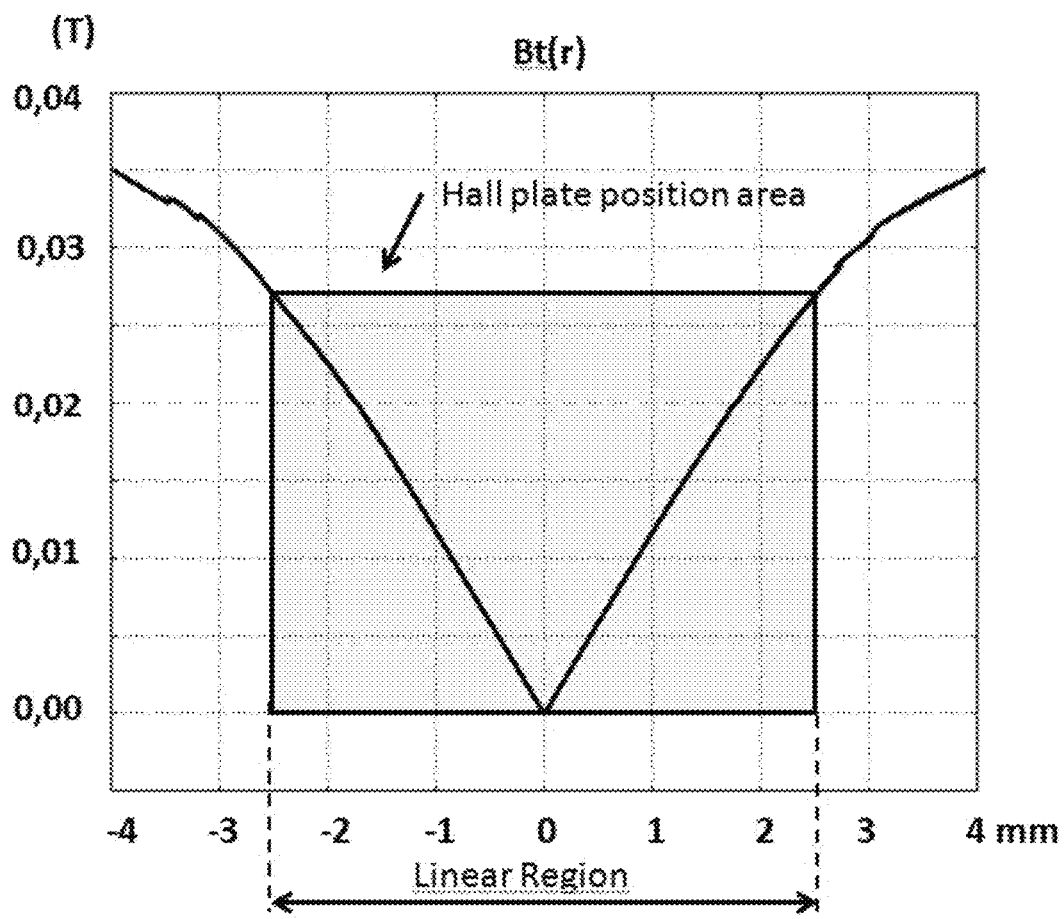
FIG. 15 shows the strength of the tangential magnetic field component of FIG. 7 in function of radius.

FIG. 15 shows a similar drawing for the strength Bt(r) of the tangential magnetic field component Bt of FIG. 7 in function of radius, measured on the line A-A. It is to be noted that a portion is drawn from −4 to +4 mm. As can be seen, the field strength is highly linear near the center, the linear range extends from about −2.5 to about +2.5 mm, and the field strength Bt ranges from 0 mT to about 27 mT. When the sensor elements are located in the area indicated by the rectangle, sensor elements of each group will compensate or cancel position offset. Since this rectangle includes the center, the distance d2 between the sensor elements can be made as small as desired, thus the die size of an integrated circuit has no impact on the position error (also known as "off-axis error"), and can be chosen independently from the magnet dimensions. Suitable diameters d2 for the imaginary circle 8 of a sensor for measuring this field component Bt would be any diameter between 0.0 and 5.0 mm, in practice from 0.1 to 5.0 mm, e.g. about 0.5 mm, about 1.0 mm, about 1.5 mm, about 2.0 mm, about 2.5 mm, about 3.0 mm, about 3.5 mm, about 4.0 mm, about 4.5 mm, or any values in between. However, if a diameter d2 of 1.0 mm is chosen, the maximum position offset which can be compensated is 0.5 mm, half the diameter.

When comparing FIG. 14 and FIG. 15, it is to be noted that the magnetic field strength of the tangential field component Bt (FIG. 15) and the radial field component Br (FIG. 14) for this magnet differ only about 10%, thus the two solutions offer substantially the same performance (accuracy, resolution) for a same distance r2 between the sensor elements and the rotation axis 4.

An arrangement with a six-pole ring magnet will be explained next, in relation to FIG. 16 to FIG. 22.

Figure 16:
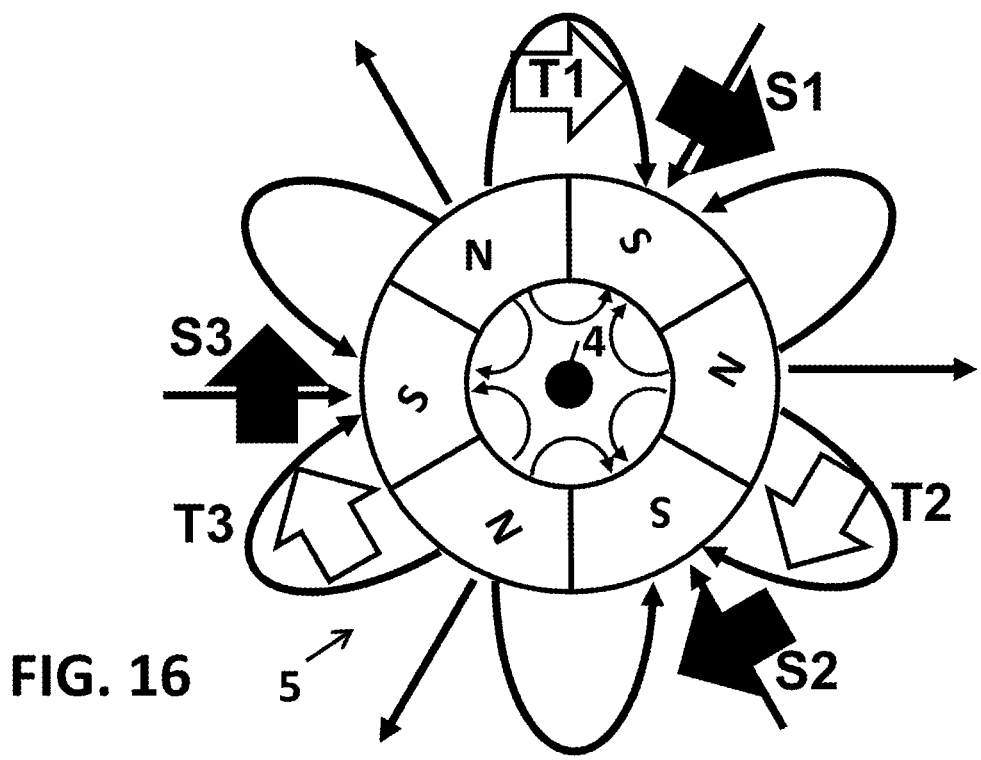
FIG. 16 shows a six-pole ring magnet with a central cylindrical opening. Some field lines are shown on the outside of the ring-magnet, although the magnetic field is not measured there, but rather below the magnet. Three bold black arrows indicate the orientation of a first group of three sensor elements (not shown), three bold white arrows indicate the orientation of a second group of three sensor elements (not shown), all sensor elements being adapted for measuring the tangential field component of the magnetic field.

FIG. 16 shows a six-pole ring-magnet 5 with a central cylindrical opening, as an example. A six-pole disk magnet with circular or polygone shape could alternatively also be used. The magnet 5 generates a periodically repetitive magnetic field pattern B around the rotation axis 4 in the vicinity of the magnet. Some magnetic field lines are shown on the outside of the ring-magnet, although the magnetic field B is not measured on the outside of the ring, but rather "below" and "on the inside" of the central magnet opening, in a plane β perpendicular to the rotation axis 4 and at an axial distance d1 from the magnet surface, similar as in the arrangement shown in FIG. 6, but now for a six-pole magnet. Three bold black arrows indicate the orientation (not the position) of a first group S of three sensor elements (not shown). The signals generated by them are indicated by S1, S2, S3. Tree bold white arrows indicate the orientation of a second group T of three sensor elements (not shown), for generating signals T1, T2, T3.

The measurement of the radial and tangential field components could be based on the principle of 3-phase sine-cosine sensing. The following equations are valid for such a measurement:

$$S1 = B\text{mag} \cdot \sin(3\alpha) + B\text{ext} \cdot \cos(\varphi\text{ext} - 2\pi/3); \tag{13}$$

$$S2 = B\text{mag} \cdot \sin(3\alpha) + B\text{ext} \cdot \cos(\varphi\text{ext} - 4\pi/3); \tag{14}$$

$$S3 = B\text{mag} \cdot \sin(3\alpha) + B\text{ext} \cdot \cos(\varphi\text{ext}); \tag{15}$$

$$T1 = B\text{mag} \cdot \cos(3\alpha) + B\text{ext} \cdot \cos(\varphi\text{ext} - 5\pi/6); \tag{16}$$

$$T2 = B\text{mag} \cdot \cos(3\alpha) + B\text{ext} \cdot \cos(\varphi\text{ext} - 3\pi/2); \tag{17}$$

$$T3 = B\text{mag} \cdot \cos(3\alpha) + B\text{ext} \cdot \cos(\varphi\text{ext} - \pi/2); \tag{18}$$

where Bmag represents the magnitude of the magnetic field to be measured (e.g. the field created by the six-pole magnet 5), and Bext represents the magnitude of a unidirectional external magnetic field under an angle φext with respect to the stator.

And:

$$\text{sum}1 = S1 + S2 + S3 = 3 \cdot B\text{mag} \cdot \sin(3\alpha); \tag{19}$$

$$\text{sum}2 = T1 + T2 + T3 = 3 \cdot B\text{mag} \cdot \cos(3\alpha); \tag{20}$$

and:

$$\text{ratio } R = \text{sum}1/\text{sum}2 = tg(3\alpha), \tag{21}$$

thus the magnitude of the constant magnetic field Bext is eliminated.

Figure 17:
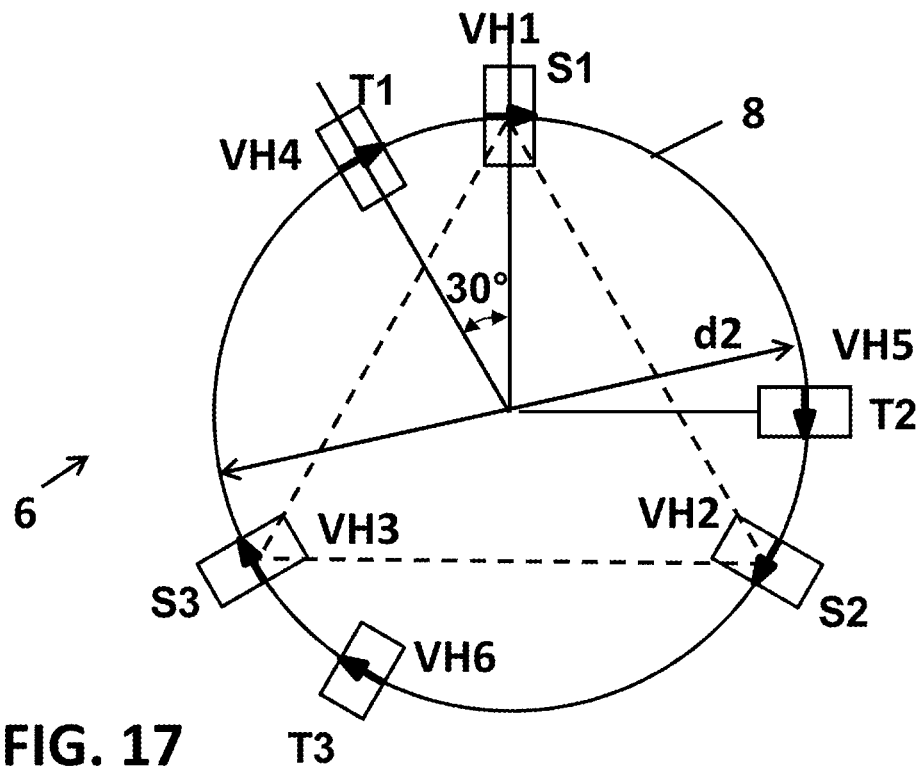
FIG. 17 shows an example of the position and orientation of six vertical Hall sensor elements of a sensor according to embodiments of the present invention, the elements lying on an imaginary circle, and adapted for measuring the tangential magnetic field component of the magnet of FIG. 16 in an arrangement as shown in FIG. 2.

FIG. 17 shows the six sensor elements VH1 to VH6 adapted for measuring the tangential field component Bt of the magnetic field at the imaginary circle 8 located in the plane β. The sensor 6 can be implemented by using so called "vertical Hall plate" sensor elements which are sensitive in the direction of the indicated arrows. In an example where the six-pole magnet 5 has an outer diameter of 12 mm, the imaginary circle may have a diameter d2 between 0 and about 3 mm. No simulations are reproduced here for this six-pole magnet, but results very similar to those of FIG. 7 and FIG. 9 and FIG. 11 are achieved, except that the field shows six "black" areas instead of four. And a plot of the field strength of the tangential or radial or axial field component Bt, Br, Bz, yields plots very similar to those of FIG. 13, FIG. 14 and FIG. 15, from which the position and/or maximum size of the "linear region" could be determined.

Referring back to FIG. 17, the angular position α is to be calculated from these sensor elements as follows. The sensor elements VH1 to VH6 are organized in two groups S, T of three elements each (in general, for a magnet with Np poles, each group of sensor elements would consist of Np/2 sensor elements). The first group S has the sensor elements providing the signals S1, S2 and S3. The sensor elements VH1, VH2, VH3 of this group S are located on the imaginary circle, at 120° angular distance from one another. In general, for a magnet with Np poles, this angular distance would be 720°/Np. The second group T has the sensor elements providing the signals T1, T2 and T3. The sensor elements VH4, VH5, VH6 of this group T are also located on the imaginary circle, at 120° angular distance from each other. The distance between a sensor element VH1 of the first group S and a sensor element VH4 of the second group T, is 180°/Np=30°, with Np=6 for a six-pole magnet. The same angular distance can be seen between VH2 and VH5, and between VH3 and VH6. In general, for a magnet with Np poles, the angular distance between elements of the different groups S, T would be 180°/Np. Then a first sum sum1 is calculated as the sum of the signals S1, S2, S3 generated by the sensor elements of the first group S:

$$\text{sum1}=S1+S2+S3 \sim \sin(3\alpha), \quad (22)$$

whereby "~" means "is proportional to".
And a second sum sum2 is calculated as the sum of the signals T1, T2, T3 generated by the elements of the second group T:

$$\text{sum2}=T1+T2+T3 \sim \cos(3\alpha) \quad (23)$$

One can then calculate a ratio R as:

$$R=\text{sum1}/\text{sum2}=\tan(3\alpha) \quad (24)$$

and the angle α can then be calculated as:

$$\alpha=(\arctan R)/3 \quad (25)$$

In embodiments of the present invention, the sensor 6 may be an integrated circuit, e.g. implemented in CMOS technology, and the means for calculating the angle α may be embedded on the same chip. Such a chip may further include analog-to-digital convertors (not shown) for digitizing the measured signals Si, Ti, and a digital signal processor (DSP) provided with an algorithm for calculating the angle α based on the formulas described above, or equivalent formulas, or tables, or in any other way known by the person skilled in the art.

It is to be noted that instead of calculating the sum of the values of a group, one could also calculate the average value of each group, and the ratio of the averages, etc, which would yield the same result for the ratio R and for the angle α.

The configuration of FIG. 17 is insensitive to offset errors of the sensor 6, because the signals generated by VH1, VH2, VH3 compensate each other. The same applies for the sensor elements VH4, VH5, VH6. The configuration of FIG. 17 is also insensitive to a uniform external magnetic field Bext, because the values measured by the sensor elements in each group S, T cancel each other, due to the 120° rotation of the sensor elements. Due to the fact that a ratio is taken of the sum or average of the field components, the absolute value of the magnetic field components is irrelevant, only their relative values matter. This means that the method is highly robust against ageing, tolerances on magnets, and temperature. The angular position range which can be measured by the sensor elements VH1 to VH6 shown in FIG. 17 using the 6-pole magnet of FIG. 16 is 120°. In general, for a magnet with Np poles, the angular range is 720°/Np.

It is to be noted that the sensor elements of each group, e.g. the elements VH1, VH2, VH3 of the first group S, form a regular polygon (instead of being located in pairs on opposite diametrical sides of the circle). In FIG. 17 the polygon is a triangle. This geometrical concept can be extended to sensors for measuring multi-pole magnets with more than six poles, e.g. for a magnet with eight poles (Np=8), the sensor elements would be located on a square. The triangle for the sensor elements VH4, VH5, VH6 of the second group T is not shown for not making the drawing obscure. But it is easy to see that, in the embodiment illustrated, the position of the T-triangle (triangle formed by the group of elements VH4, VH5, VH6) can be easily obtained by rotating the S-triangle (triangle formed by the group of elements VH1, VH2, VH3) over 180°/Np=30° in this example, since Np=6 for a six-pole magnet.

Figure 18:
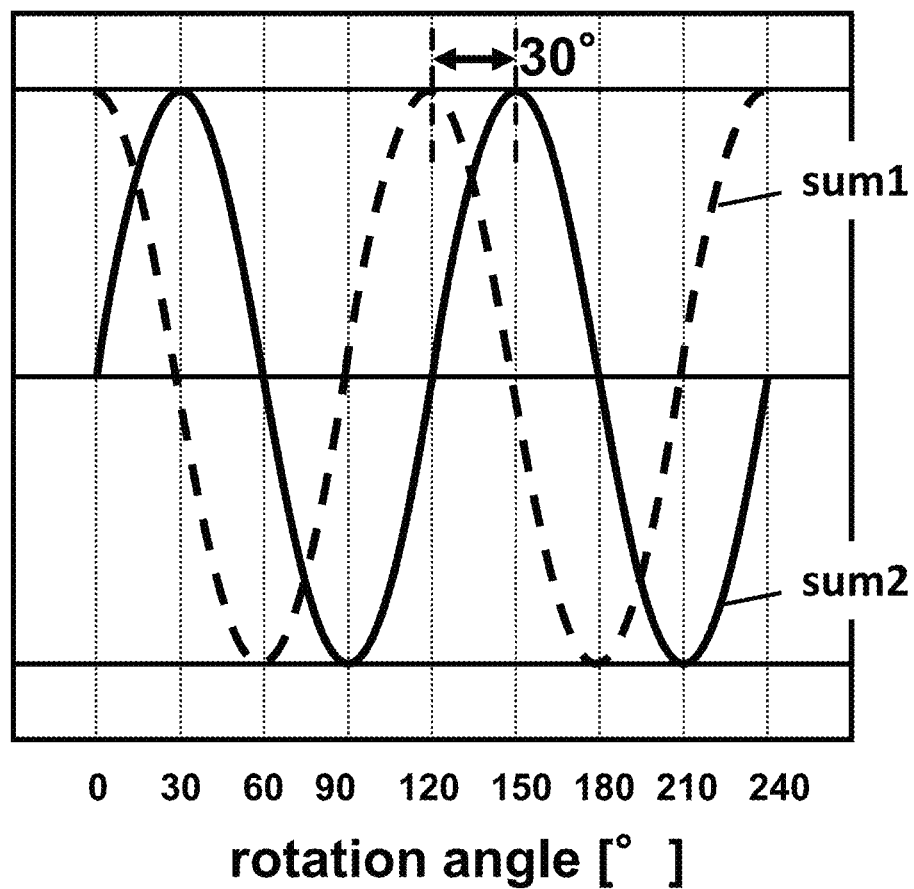
FIG. 18 shows an example of sine and cosine signals which can be obtained from the sensor elements of FIG. 17 when used in combination with the six-pole magnet of FIG. 16.

FIG. 18 shows an example of the combined sine and cosine signals, e.g. of the sum signals sum1 and sum2 (or of the average signals avg1 and avg2), which can be obtained from the groups S, T of the sensor elements of FIG. 17, when being rotated with respect to the ring magnet. As indicated, the phase difference between the two sum-signals is 30°, and the signals have a period of 120°, which is the maximum angular range of α which can be measured by the sensor of FIG. 17.

Figure 19:
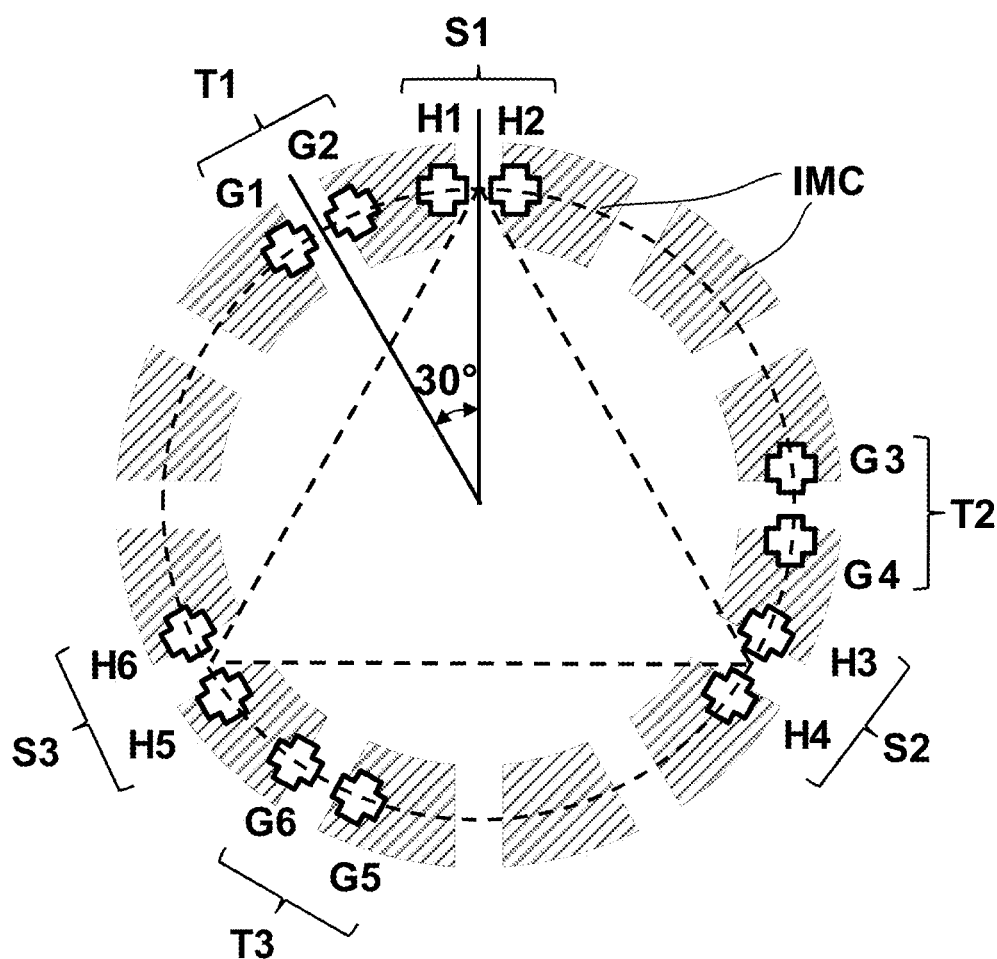
FIG. 19 shows an embodiment of a sensor having pairs of horizontal Hall plate elements and Integrated Magnetic Concentrators (IMC) as can be used in conjunction with the six-pole ring magnet of FIG. 16.

FIG. 19 shows another embodiment of a sensor 6 for measuring the tangential field components Bt of the six-pole ring-magnet shown in FIG. 16. This sensor 6 looks like the sensor 6 shown in FIG. 17, except that each vertical Hall plate sensor element VHi is replaced by a pair of two adjacent horizontal Hall plate elements and Integrated Magnetic Concentrators (in short IMC). The IMC converts a magnetic field parallel with the chip surface locally into a field perpendicular to the surface, or in other words, converts the tangential and radial field components Bt, Br into an axial field component Bz. The perpendicular component of the magnetic field is then sensed by conventional planar Hall elements (also called "horizontal Hall plate" elements). A magnetic concentrator also functions as a passive magnetic amplifier and improves sensor performance.

The signals H1, H2, of the pair of adjacent sensor elements are subtracted, so as to form a single signal S1. During the same operation any Bz field from an external (unwanted) field is subtracted, so that it does not impact the reading of S1. The same applies for the signals obtainable from the other pairs.

It is to be noted that the IMC makes an additional gain, but it also rotates the local tangential field component (flux-lines) into an axial direction, substantially perpendicular to the horizontal Hall elements Gi, Hi (i=1 to 6). The former is indicated hereinafter by a multiplication (*IMC), but the latter cannot be expressed by a formula in a simple manner. Thus S1=(H1−H2)~ the strength of the tangential field Bt (at the location of VH1 of FIG. 17) multiplied by the factor IMC, or S1=(H1−H2)*IMC. It is to be noted that the abbreviation IMC is used herein to indicate the integrated magnetic concentrator itself, or its amplification value. It will be clear from the context which one of both meanings is intended. Likewise S2=(H3−H4)*IMC, S3=(H5−H6)*IMC, T1=(G1−G2)*IMC, T2=(G3−G4)*IMC and T3=(G5−G6)*IMC. From these signals Si and Ti, the first and second sum1, sum2 (or first and second average) can be calculated as described before, and the ratio R, and the angle α. It is an advantage of this embodiment that "horizontal hall plate" elements can be used, which are about 2-4 times more sensitive (depending on the technology applied) and which feature an offset (and offset drift with temperature and lifetime) which is about 5-10 times smaller than "vertical" Hall elements.

It is to be noted that the arrangement of FIG. 19 does not measure the axial component Bz of the magnetic field (as was illustrated in FIG. 11 for a four-pole magnet).

Since the difference between two Hall plates which are close to one gap is built, the common mode part (Bz component) is eliminated. As for the differential part (e.g. the part of Bz which is different on H1 compared to H2) it merely adds a harmonic signal with the same periodicity as radial/tangential field and is therefore just adding signal.

The IMC has some kind of periodicity, similar to the magnet field. The dimensions of the IMC are: (a) thickness, which is determined by the technology, and (b) ring width, which is a question of design. Thickness and width must be made such that on one hand they give a good, e.g. the highest, gain on the Hall devices, but on the other hand there must not be saturation effects from the magnetic field bringing non-linearity. Suitable dimensions can be determined by routine tests, or by trial and error.

Figure 20:
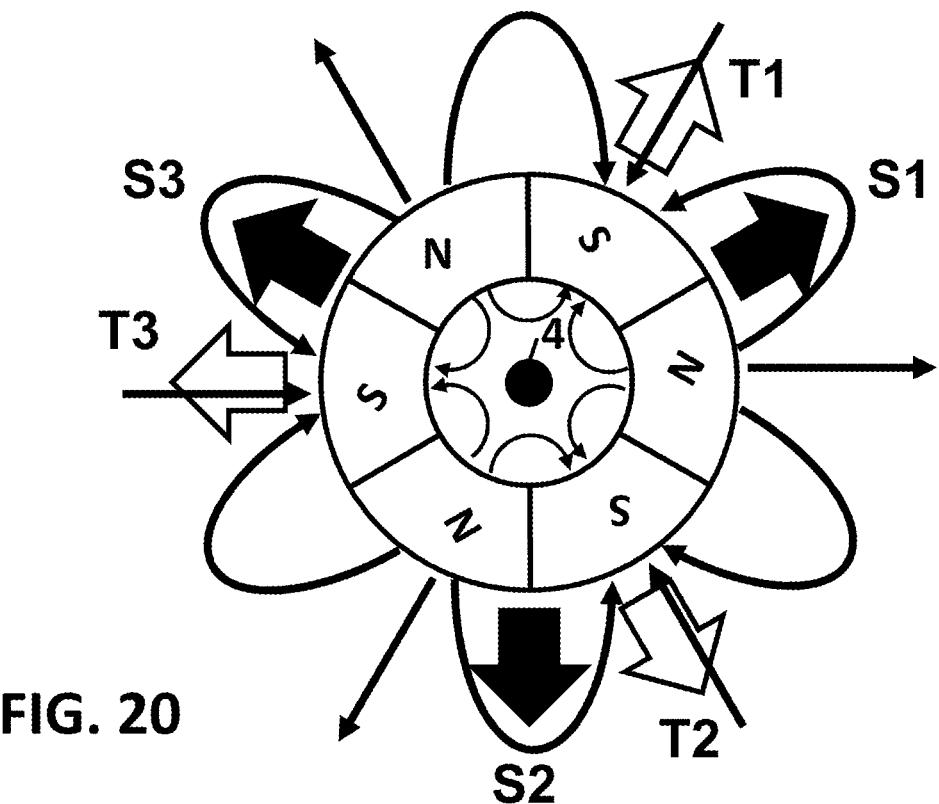
FIG. 20 shows the same six-pole ring magnet with a central cylindrical opening as shown in FIG. 16. Three bold black arrows indicate the orientation of a first group of three sensor elements (not shown), three bold white arrows indicate the orientation of a second group of three sensor elements (not shown), all sensors being adapted for measuring the radial field component.

FIG. 20 shows the same six-pole ring magnet with a central cylindrical opening as shown in FIG. 16. As before, the three bold black arrows indicate the orientation of a first group S of three sensor elements (not shown in FIG. 20), and the three bold white arrows indicate the orientation of a second group T of three sensor elements (not shown in FIG. 20), all sensor elements being adapted for measuring the radial field component Br. The signals generated by the sensor elements of the first group S are indicated by S1, S2, S3. The signals generated by the sensor elements of the second group T are indicated by T1, T2, T3.

Figure 21:
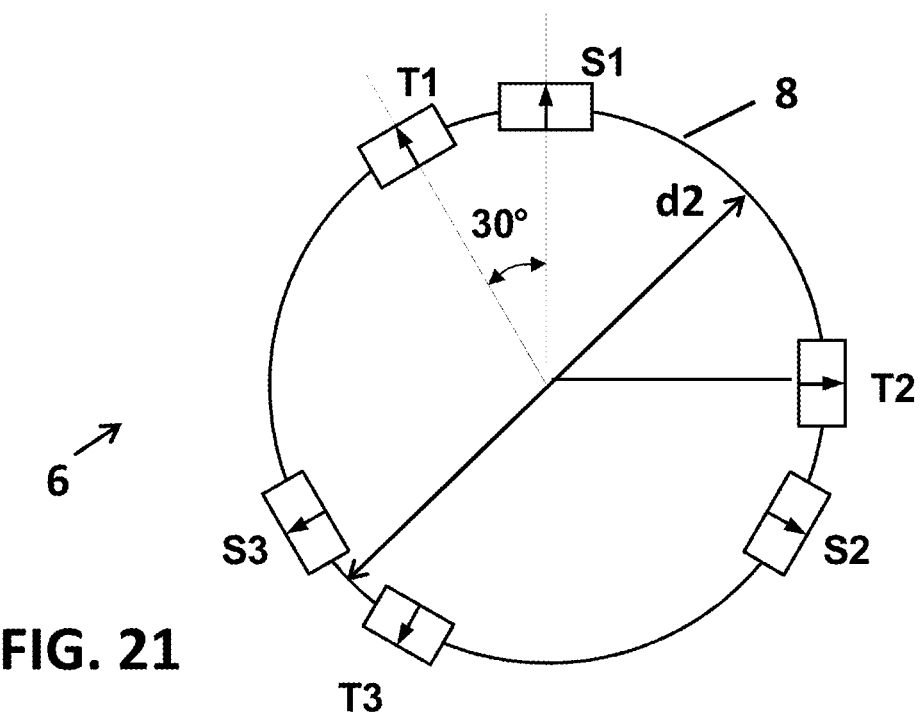
FIG. 21 shows an example of the position and orientation of six vertical Hall sensor elements of a sensor according to embodiments of the present invention, the elements lying on an imaginary circle, and adapted for measuring the radial magnetic field component of the magnet of FIG. 20 in an arrangement as shown in FIG. 2.

FIG. 21 shows an embodiment of the position and orientation of six vertical Hall sensor elements of a sensor 6 for determining an absolute position α using the six-pole ring magnet of FIG. 20. The sensor elements are located on an imaginary circle with diameter d2, and adapted for measuring the radial magnetic field component Br of the magnet of FIG. 20 in plane β at an axial distance d1 from the magnet, and in line with the rotation axis 4 of the magnet, as shown in FIG. 2. This is a variant of the embodiment shown in FIG. 17, and everything which was said for the sensor 6 of FIG. 17 is also applicable for the sensor of FIG. 21, except for the orientation of the magnetic field component, and the corresponding orientation of the sensor elements.

Figure 22:
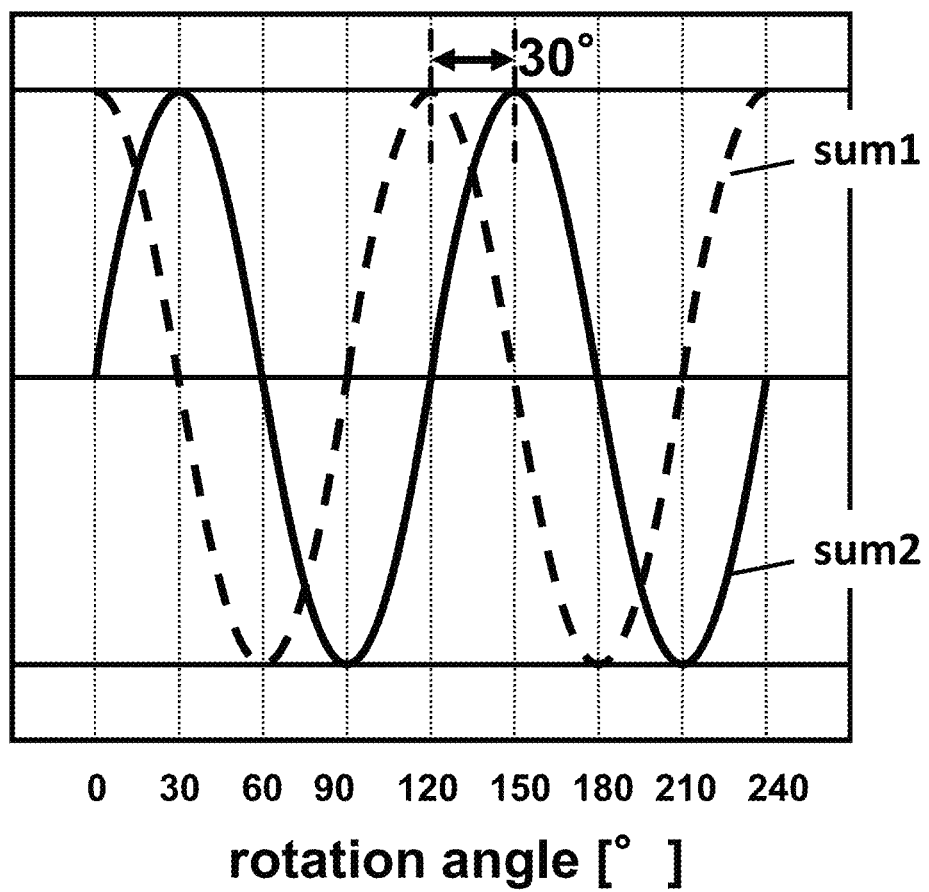
FIG. 22 shows an example of sine and cosine signals which can be obtained from the sensor elements of FIG. 21.

FIG. 22 shows an example of the combined sine and cosine signals sum1, sum2 which can be obtained from the sensor 6 of FIG. 21. It is to be noted that these signals are in principle identical to those of FIG. 18, but these signals are generated by measuring the radial field component Br instead of the tangential field component Bt. Both solutions of FIG. 17 and FIG. 21 are substantially equivalent with respect to accuracy, resolution, insensitivity to sensor position offset, and insensitivity to a constant external magnetic field Bext. This concept can be extended to other multi-pole ring or disc magnets, having at least four magnetic poles, and a central cylindrical hole.

Figure 23:
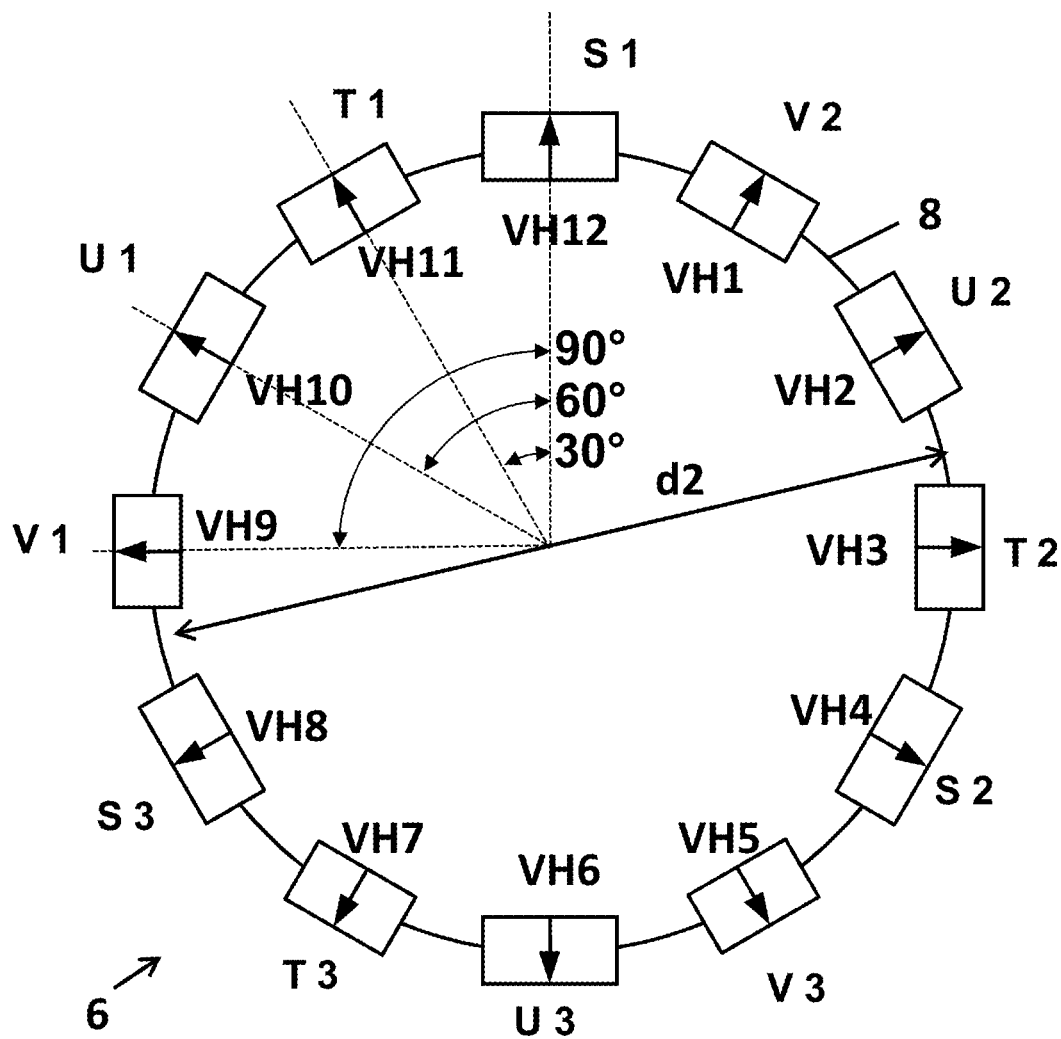
FIG. 23 shows an example of a sensor having twelve vertical Hall sensor elements, oriented for measuring the radial magnetic field component of a six-pole magnet. It has twice the number of sensor elements of the sensor of FIG. 21, which can be used for increased accuracy or reliability check. In another embodiment, this same arrangement but with other arithmetic, can also be used for measuring the angular position in a way which is substantially insensitive to an external constant field, and to an external constant field gradient.

FIG. 23 shows an example of a sensor 6 having twelve vertical Hall sensor elements VH1 to VH12, oriented for measuring the radial magnetic field component Br of a six-pole magnet, e.g. the six-pole ring-magnet of FIG. 16. When comparing this sensor 6 with the sensor of FIG. 17 and FIG. 21, it is to be noted that the sensor of FIG. 23 has twice the number of sensor elements. In the example shown in FIG. 23, all sensor elements are oriented for measuring a radial field component Br, but that is not absolutely required, and all or half of the elements could be oriented for measuring the tangential field components Bt. In the last example, the sensor 6 would be seen as a combination of the sensor elements of the sensor shown in FIG. 17 and the one shown in FIG. 21. The redundancy may be used for improved accuracy, or an improved position-offset insensitivity, or improved rejection to irregularities of the magnet, or simply as a reliability check.

In accordance with embodiments of the present invention, the sensor elements are organized in four groups S, T, U, V of three sensor elements each, the number of sensor elements in a group being equal to half the number of poles Np of the magnet. The elements in each group are distributed equidistantly, hence at an angular distance of 720° divided by the number of poles, thus 720°/Np=120°, since Np=6 for the six-pole magnet. The elements of the first group S are thus VH12, VH4 and VH8, the elements of the second group T are VH3, VH7, VH11. The elements of the third group U are VH2, VH6, VH10. The elements of the fourth group V are VH1, VH5, VH9.

The elements of the second group T are located at the positions which would be taken when the elements of the first group S are rotated over 180°/Np, e.g. 30° for a six-pole magnet in the example of FIG. 23. The elements of the third group U are located at the positions which would be taken when the elements of the first group S are rotated over 2×(180°/Np), e.g. 2×30°=60°. The elements of the fourth group V are located at the positions which would be taken when the elements of the first group S are rotated over 3×(180°/Np), e.g. 3×30°=90°.

The first group S could comprise the sensors VH12, VH4 and VH8, and their signals S1, S2, S3 would be added to form a combined signal sum1. The second group T could comprise the sensors VH3, VH7 and VH11, and their signals T1, T2, T3 would be added to form a combined signal sum2. The third group U could comprise the sensors VH2, VH6 and VH10, and their signals U1, U2, U3 would be added to form a combined signal sum3. The fourth group V could comprise the sensors VH1, VH5 and VH9, and their signals V1, V2, V3 would be added to form a combined signal sum4.

A first angle α1 could then e.g. be calculated as [arctan (sum1/sum2)]/3+offset1, and a second angle α2 could then e.g. be calculated as [arctan(sum3/sum4)]/3+offset2, whereby offset1 and offset2 can be determined during manufacturing, e.g. by calibration. The values offset2 and offset1 would typically vary by about 60°. Depending on the application, these angles α1 and α2 could be averaged to form a single angle α, or the two angles α1 and α2 could be compared, and if their values differ above a given threshold, an error signal could be provided by the sensor, as an indication of a problem.

It is to be noted that in the drawings the second, third and fourth group T,U,V are rotated in counter-clockwise direction with respect to the first group S, but they could also be rotated in clock-wise direction. The formulas for calculating the angle would be identical, but the resulting angular position of the rotor w.r.t. the stator would be measured in the opposite direction. However, such a sensor and method would yield the same advantages.

Second Algorithm

Another aspect of the present invention will be explained with reference to FIG. 23 to FIG. 28. It is to be noted that FIG. 23 is used to describe two different embodiments, depending on which formulas are used to calculate the angular position. Most embodiments described above, are robust for a uniform external magnetic field Bext, e.g. a field having a constant amplitude and a constant direction, as indicated by the arrows in FIG. 2. Most of the embodiments described above, are also robust against position offset errors, however, none of these embodiments is robust against a non-uniform external magnetic field.

After years of ongoing research in the domain of angle sensors, the inventors have surprisingly found that it is also possible to eliminate, or at least partially compensate for a magnetic field having a constant gradient. This means that the external magnetic field and/or a magnetic field component may vary in a linear way in the X and/or Y and/or Z-direction without substantially influencing the measured angle.

Figure 24:
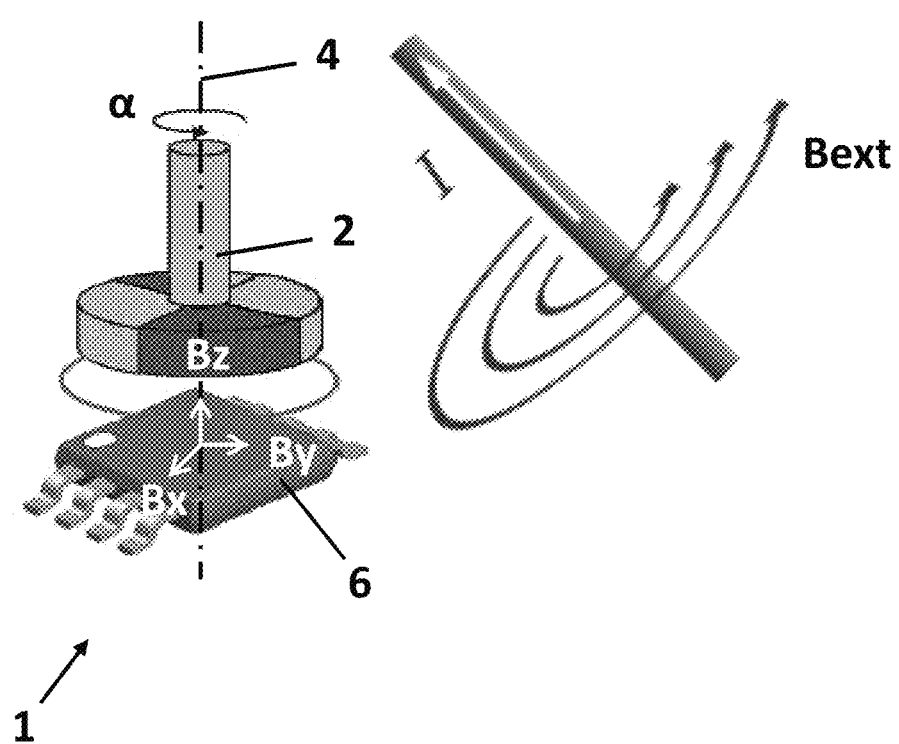
FIG. 24 shows the arrangement of FIG. 2, but instead of the constant external field, an external field caused by a current conducting wire, is shown.

FIG. 24 shows a typical example in an automotive application, where the angular position sensor 6 is located in the vicinity of a current carrying conductor. It is well known that the magnitude of a magnetic field around such a current carrying conductor can be described by the formula:

$$H = I/2\pi r \tag{26}$$

where I is the current running through the conductor, r is the distance from the conductor at which the field is observed, and B or H are both used to describe the magnetic field, whereby B=μH, where μ is a material (or medium) dependent value. Over a small area located at a predefined non-zero distance from the wire, e.g. over the small area defined by the sensor 6, the magnetic field caused by the current in the wire can be approximated by a constant field plus a constant field gradient.

In contrast to FIG. 2 where the external field Bext is constant on all locations of the sensor chip, the magnetic field Bext of FIG. 24 is not constant over the sensor chip. Only when the sensor chip is at a relatively large distance with respect to the conductor, the external field can be approximated by its zero-order term, that is a constant vector (Bxo, Byo, Bzo).

However, when the sensor chip is closer to the conductor, the zero-order term is not a good approximation anymore. It can be seen, that the magnitude of such a field is proportional to 1/r. So the field contains a gradient which is nonlinear. As an example, when the angular position sensor is placed at a distance of 25.0 mm from a straight current conductor carrying I=400 A, the sensor will see a magnetic flux density of about 3.2 mT generated by this current. If the sensor has a physical dimension of about 1.0 mm, then the part of the sensor closer to the conductor sees a field of 3.14 mT and the part further from the conductor sees a field of 3.27 mT. The external field can thus not be considered constant over the sensor surface, but over such a small distance of 1.0 mm at a relatively large distance of 25.0 mm, the field can be approximated by its zero order and first order terms, while the second and higher order terms are negligible. In other words, a constant value plus a constant (three-dimensional) gradient. The inventors have now surprisingly found that it is possible to substantially compensate not only for the zero-order term (the uniform field as discussed above), but also for these first order terms (the constant gradient), as will be described next.

A first arrangement which is capable to substantially compensate for such a constant gradient is the configuration of FIG. 23, in combination with a six-pole permanent magnet (e.g. the 6-pole ring-magnet shown in FIG. 20), but by using the following equations to calculate the angular position:

$$\sin(3\alpha) = (S1+S2+S3)-(U1+U2+U3); \tag{27}$$

$$\cos(3\alpha) = (T1+T2+T3)-(V1+V2+V3); \tag{28}$$

$$\text{ratio} = \sin(3\alpha)/\cos(3\alpha) = \tan(3\alpha); \tag{29}$$

$$\alpha = (\arctan \text{ratio})/3; \tag{30}$$

Alternatively, the following equivalent set of formulas can be used:

$$\text{sum1} = S1+S2+S3; \tag{31}$$

$$\text{sum2} = T1+T2+T3; \tag{32}$$

$$\text{sum3} = U1+U2+U3; \tag{33}$$

$$\text{sum4} = V1+V2+V3; \tag{34}$$

$$\text{diff1} = \text{sum1}-\text{sum3}; \tag{35}$$

$$\text{diff2} = \text{sum2}-\text{sum4}; \tag{36}$$

$$\text{ratio} = \text{diff1}/\text{diff2} = \tan(3\alpha); \tag{37}$$

$$\alpha = (\arctan \text{ratio})/3; \tag{38}$$

This position sensor 6 has twelve vertical Hall sensing elements VH1 to VH12, adapted for measuring the radial field component (Br) of a six-pole magnet, as shown in FIG. 20. In the embodiment illustrated, the sensor elements are partitioned in four groups S, T, U, V of three elements each. In general the number of elements in a group equals the number of magnet poles Np divided by two. The elements within each group, e.g. VH12, VH4, VH8 in the first group S, are located at an angular distance of 120° apart (in general: 720°/Np). The elements of the second group T are located at the positions which the elements of the first group S would assume after rotation over 180°/Np, e.g. 30° when Np=6 (six-pole magnet). The elements of the third group U are located at the positions which the elements of the first group S would assume after rotation over 360°/Np, e.g. 60° when Np=6. The elements of the fourth group V are located at the positions which the elements of the first group S would assume after rotation over 540°/Np, e.g. 90° when Np=6. The position sensor has means for calculating the angular position α according to the above formulas (27) to (38), or equivalent formulas.

Simulations have shown that such a sensor has the following characteristics:

1) the position α thus determined is substantially insensitive (or at least has a reduced sensitivity) to position offset.

2) the position α thus determined is substantially insensitive (or at least has a reduced sensitivity) to a constant external magnetic field.

3) the position α thus determined is substantially insensitive (or at least has a reduced sensitivity) to an external magnetic field having a substantially constant gradient, e.g. that changes linearly in any of the X, Y, Z directions. As far as known to the inventors, this technical effect is not obtained by prior art angular position sensors. Such a sensor is ideal for industrial or automotive applications, where an angular position needs to be accurately determined, even in environments where unwanted magnetic fields are present, such as caused by currents flowing in (relatively) nearby conductors.

Figure 25:
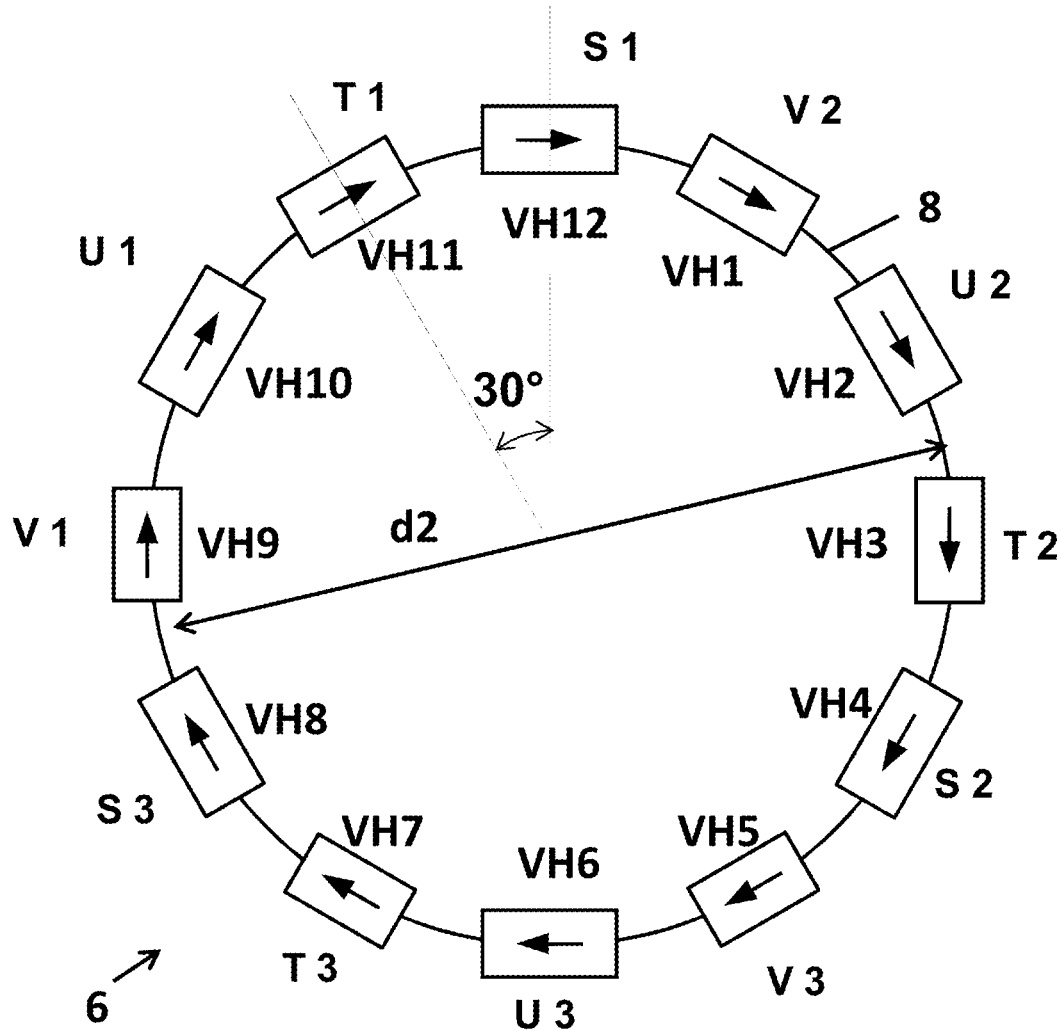
FIG. 25 is a variant of the sensor of FIG. 23, having twelve vertical Hall sensor elements, oriented for measuring the tangential magnetic field component of the six-pole magnet of FIG. 16, which is substantially robust against a constant external field and/or an external field with a constant gradient in any direction.

FIG. 25 shows another embodiment of an angular position sensor with twelve sensor elements VH1 to VH12, arranged at equidistant positions on a virtual circle, to be used in conjunction with a six pole ring magnet or six pole disk magnet. This position sensor 6 has twelve vertical Hall sensing elements VH1 to VH12, adapted for measuring the tangential field component Bt of a six-pole magnet, as shown in FIG. 16. In the embodiment illustrated, the sensor elements VH1 to VH12 are partitioned in four groups S, T, U, V of three elements each. In general, when the elements are partitioned in four groups, the number of elements in a group equals the number of poles divided by two. The elements within each group, e.g. VH12, VH4, VH8 in the group S, are located at an angular distance of 120° apart (in general: 720°/Np). The elements of the second group T are located at the positions which the elements of the first group S would assume after rotation over 180°/Np, e.g. 30° as Np=6 for a six-pole magnet. The elements of the third group U are located at the positions which the elements of the first group S would assume after rotation over 360°/Np, e.g. 60°. The elements of the fourth group V are located at the positions which the elements of the first group S would assume after rotation over 540°/Np, e.g. 90°.

The same formulas as were used for the embodiment of FIG. 24 can be used to calculate the angular position α:

$$\sin(3\alpha)=(S1+S2+S3)-(U1+U2+U3); \quad (39)$$

$$\cos(3\alpha)=(T1+T2+T3)-(V1+V2+V3); \quad (40)$$

$$\text{ratio}=\sin(3\alpha)/\cos(3\alpha)=\tan(3\alpha); \quad (41)$$

$$\alpha=(\arctan \text{ratio})/3; \quad (42)$$

And the sensor has the same advantages of i) being substantially insensitive to position offset, and ii) to a constant external magnetic field, and iii) to a constant external field gradient.

Figure 26:
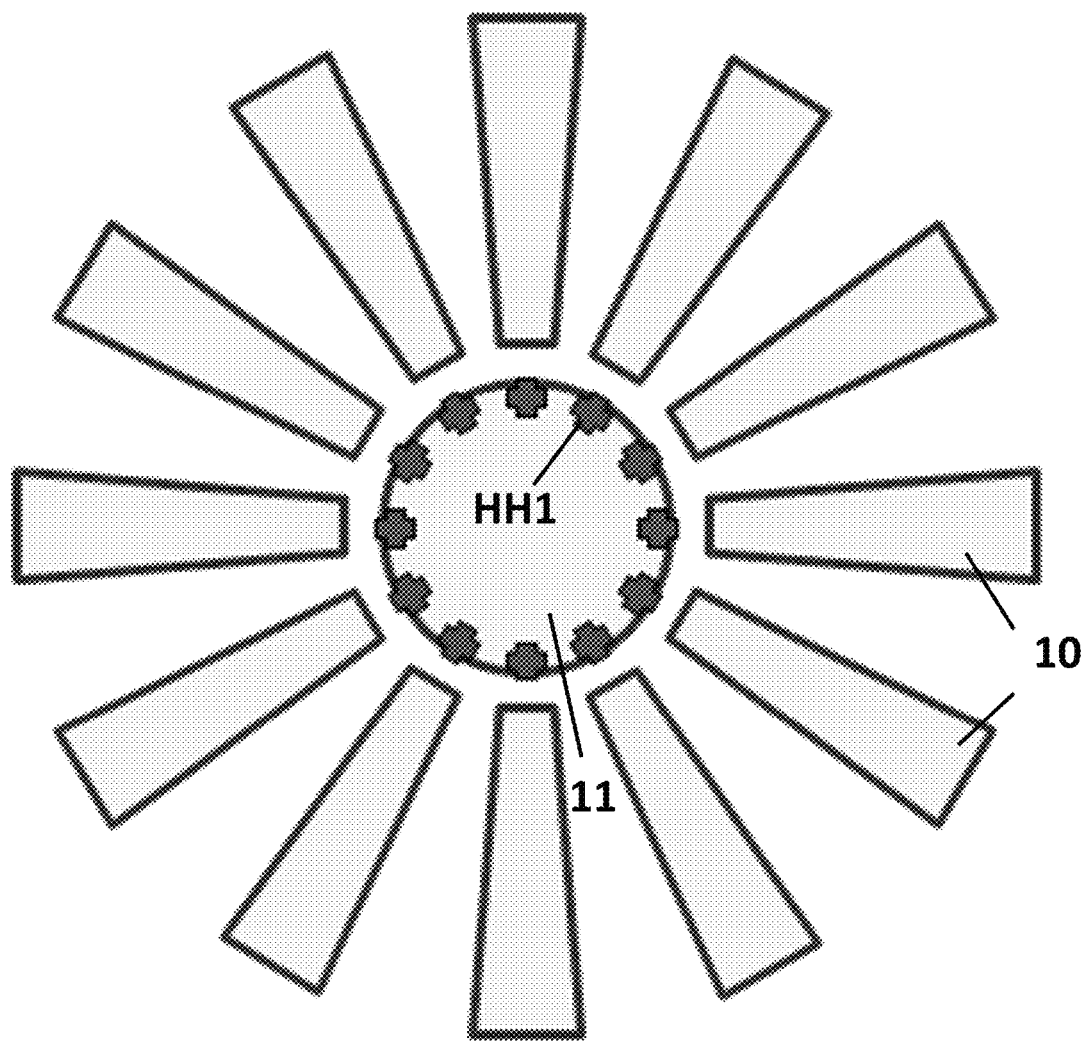
FIG. 26 shows an embodiment of a sensor with twelve horizontal Hall elements and Integrated Magnetic Concentrators comprising a central disk and a plurality of elongated strips, according to the present invention, the Hall elements being arranged under the central disk.

FIG. 26 shows another embodiment of an arrangement with twelve magnetic sensing elements, as can be used in a magnetic angular position sensor, which is substantially insensitive to position offset, and to a constant external magnetic field, and to a constant external field gradient. In this embodiment, the magnetic sensing elements are so-called horizontal Hall elements arranged at equidistant positions on a circle, but in addition the sensor further comprises an integrated magnetic concentrator (abbreviated as IMC). The IMC comprises a central part 11 located on top of the horizontal Hall elements, and a plurality of elongated parts 10, e.g. trapezoidal shaped strips, located at a distance from the Hall element and oriented in radial directions. The principle of using magnetic concentrators for bending the radial and tangential magnetic field lines is known a.o. from US20020021124. Suitable, e.g. optimal, shape and dimensions (e.g. length, width, thickness) of these concentrators can be experimentally determined. In the example shown, the concentrator comprises a center disk and twelve trapezoidal "sun-rays" around the center disk, one "sun-ray" per Hall sensor. Such integrated magnetic concentrators IMC can be applied as a post-process when fabricating the sensor device. Due to the local deflection of the magnetic field by the IMC, the Hall elements HH1, etc. measure the combination of the radial component Br and the vertical component Bz (vertical to the plane of the Figure). The radial component Br is amplified due to the IMC by a factor which is typically in the range between 1 and 10, depending on the exact IMC geometry, while the Bz component is subtracted from it. So the Hall voltage Vh generated by each Hall element is for example Vh=SE×(5 Br−Bz) with SE being the Hall element sensitivity.

Figure 27:
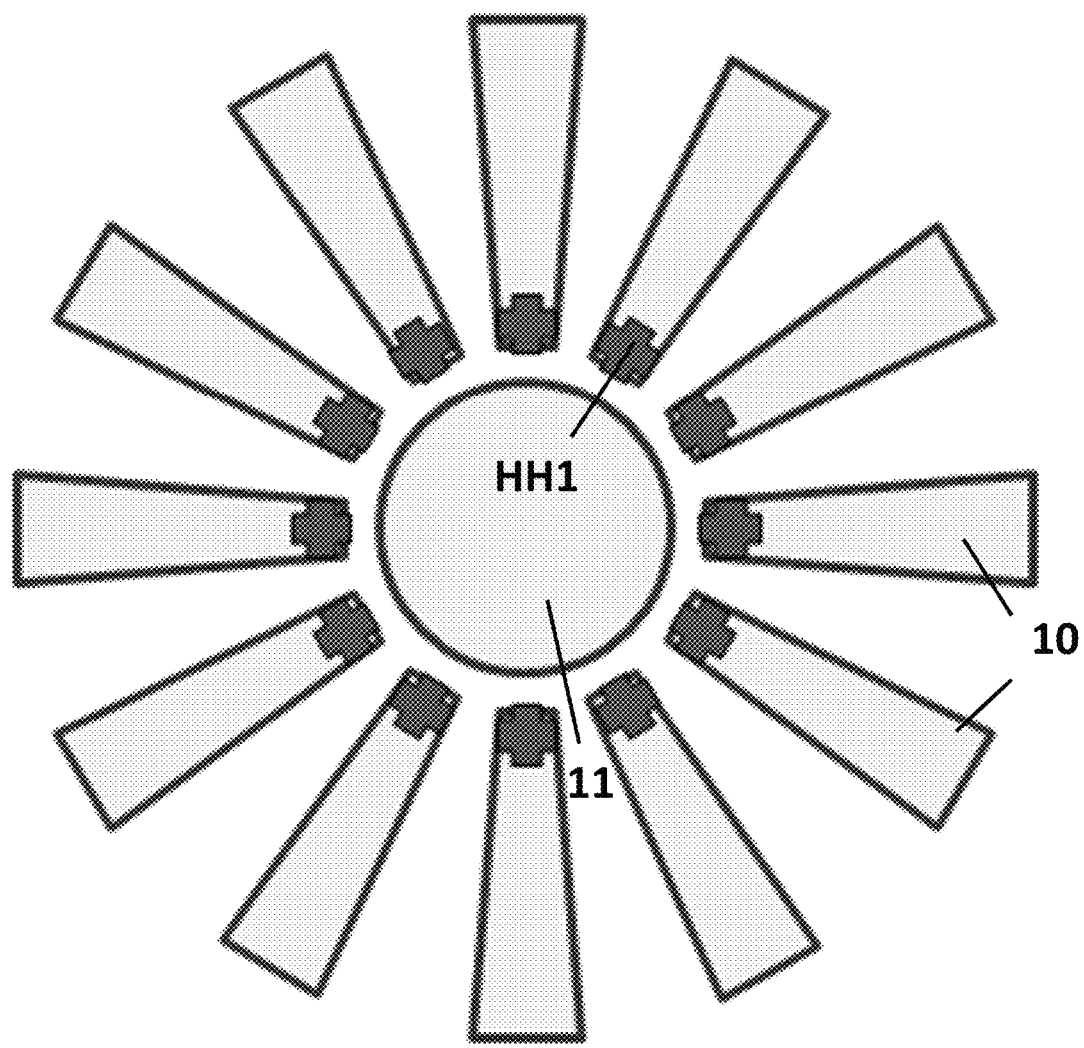
FIG. 27 shows a variant of the embodiment of the sensor shown in FIG. 26, the Hall elements being arranged under the elongated strips.

FIG. 27 shows a variant of the embodiment of FIG. 26, whereby the Hall elements are positioned under the inner edge of the elongated concentrators ("sun-rays"). In this case the Hall elements again measure the radial field component Br with a certain gain between 1 and 10, and also measure the vertical component Bz. But, compared to the embodiment of FIG. 26, the Bz component now has the opposite sign. So, the Hall voltage generated by each element would be Vh=SE×(5 Bx+Bz) with SE being the Hall element sensitivity.

In mathematical terms, the insensitivity to a constant external magnetic field, and to a constant magnetic field gradient, may be described as follows. Reference is made to FIG. 24. In practice there may be many external sources causing an external field, but for the sake of the discussion below, only the magnetic field Bext caused by the current flowing in the conductor is considered. The magnetic field Bext is a three-dimensional function, depending on the location (x,y,z). Locally, over the sensor area of the angular position sensor, this field can be approximated by its zero and first order terms, as expressed by the following formula:

$$B_s = \begin{pmatrix} Bx_0 \\ By_0 \\ Bz_0 \end{pmatrix} + \begin{pmatrix} \frac{dBx}{dx} & \frac{dBx}{dy} & \frac{dBx}{dz} \\ \frac{dBy}{dx} & \frac{dBy}{dy} & \frac{dBy}{dz} \\ \frac{dBz}{dx} & \frac{dBz}{dy} & \frac{dBz}{dz} \end{pmatrix} \cdot \begin{pmatrix} x_s \\ y_s \\ z_s \end{pmatrix} \quad (43)$$

where (Bxo, Byo, Bzo) is a three-dimensional (constant) vector formed by the zero-order term of the function, and dBn/dm are the field gradients for n=x, y, z and m=x, y, z, and (xs, ys, zs) are the coordinates on the sensor chip.

If the sensor plane is defined as z=0 (e.g. if we position the X, Y, Z axes as shown in FIG. 24), the equation reduces to:

$$B_s = \begin{pmatrix} Bx_0 \\ By_0 \\ Bz_0 \end{pmatrix} + \begin{pmatrix} \frac{dBx}{dx} & \frac{dBx}{dy} & \frac{dBx}{dz} \\ \frac{dBy}{dx} & \frac{dBy}{dy} & \frac{dBy}{dz} \\ \frac{dBz}{dx} & \frac{dBz}{dy} & \frac{dBz}{dz} \end{pmatrix} \cdot \begin{pmatrix} x_s \\ y_s \\ 0 \end{pmatrix} \quad (44)$$

where dBx/dx, dBx/dy, dBx/dz, dBy/dx, etc are constants.

All embodiments explained above with reference to FIG. 23 to FIG. 27 and wherein the angle is calculated according to formula (27) or higher, have in common that by the combination of the signals of the twelve sensor elements as indicated, 1) Any homogeneous external magnetic field with vector (Bx0, By0, Bz0) is substantially cancelled out (or at least reduced) and does not disturb the measurement of the angular position, but in addition,
2) Any constant gradient field is also substantially cancelled out (or at least reduced) and does not disturb the angle measurement.

Simulation results using an arrangement as shown in FIG. 24, and a configuration of twelve Hall sensors as shown in FIG. 25 and the formulas (39) to (42) have surprisingly shown that the DC-component is substantially completely eliminated, while the first order coefficients dBn/dm were reduced by at least a factor of two, preferably at least a factor five, more preferably at least a factor ten. In a particular simulation, with a current of 400 A running through a conductor, the magnetic field at a distance of 25 mm is 3.2 mT, and the magnetic field gradient is 130 μT/mm (microTesla per mm). Thus a classical sensor with a size of 1 mm would measure a remaining error signal of 130 μT. Accurate finite element simulations have demonstrated that by using the sensor of FIG. 25 in combination with the formulas [39] to [42], the remaining error signal was reduced to below 5 μT, which was the simulation noise level. This may be explained as follows: The canceling out of the zero-order term seems to be due to the fact that the value of two groups having the same "center of gravity" and the same amplitude (same radius) are subtracted, yielding a zero result. The canceling out of the gradient (first order term) seems to be comparable to three-phase alternating current. Any potential gradient direction corresponds to a specific moment in the three phase period, but no matter which moment is looked at, the sum of the three phases is always zero.

It is clear that the main advantage of such a sensor is that it can measure the position with an improved accuracy, even in the presence of an external magnetic field caused by a current flowing in one or more conductors, such as is the case "under the hood" of a vehicle.

Figure 28:
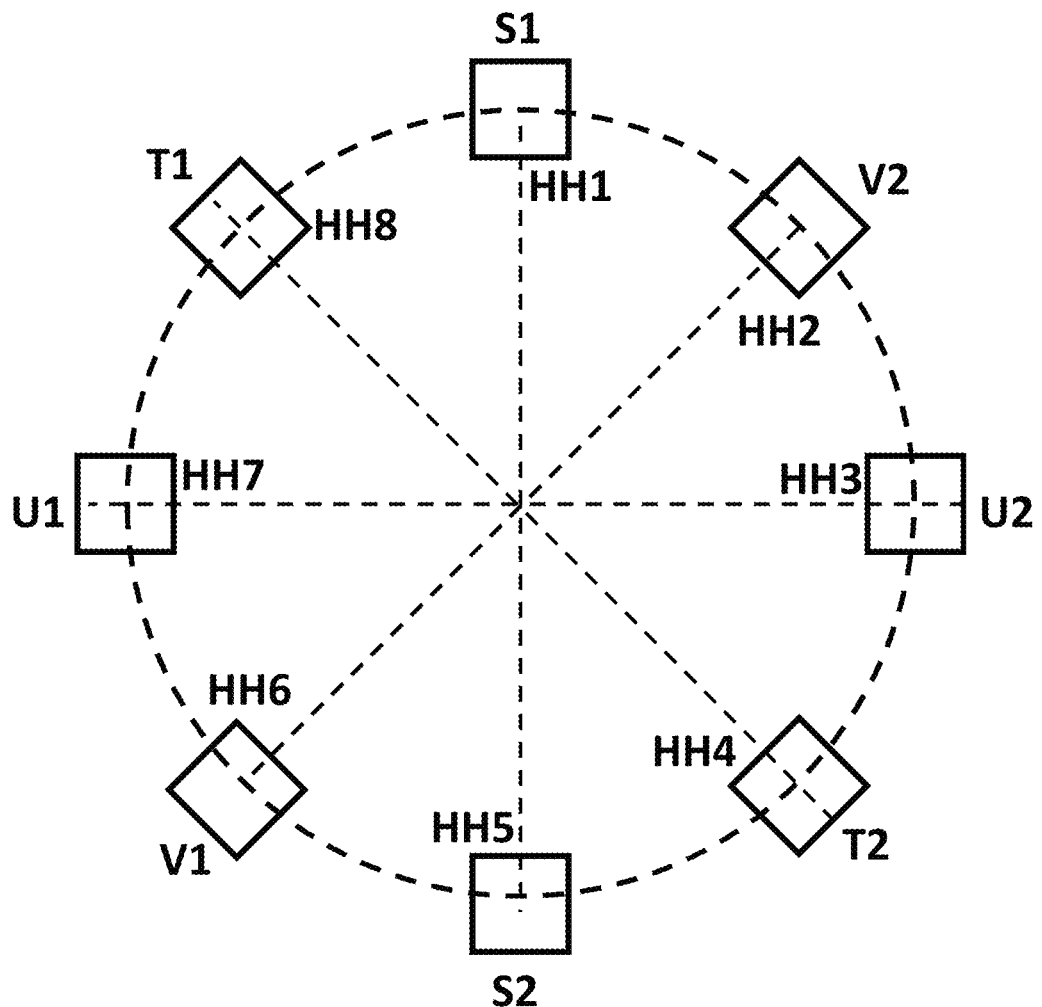
FIG. 28 shows an arrangement of eight sensor elements according to aspects of the present invention, for use in conjunction with a four-pole ring magnet shown in FIG. 4.

FIG. 28 shows another embodiment of the present invention, where the position sensor 6 has eight horizontal Hall elements HH1 to HH8, but no magnetic concentrator is used, hence these Hall elements are sensitive to the vertical field Bz component. This sensor is to be used together with a four-pole ring magnet, an example of which is shown in FIG. 6. FIG. 11 shows an example of the vertical field components Bz provided by such a magnet.

The eight Hall elements HH1 to HH8 are divided in four groups S, T, U, V, each group comprising half the number of poles of the magnet, hence 2 elements (Np=4 for the four-pole magnet). The elements in each group are distributed equidistantly, hence at an angular distance of 720°/Np=180°. The elements of the second group T are located at the positions which would be taken when the elements of the first group S are rotated over 180°/Np or 45° in this example. The elements of the third group U are located at the positions which would be taken when the elements of the first group S are rotated over 2×180°/Np, or 90° in this example. The elements of the fourth group V are located at the positions which would be taken when the elements of the first group S are rotated over 3×180°/Np, or 135° in this example.

The angular position between the sensor and the rotor is calculated as follows:

$$sum1 = S1 + S2 \quad (45)$$

$$sum2 = T1 + T2 \quad (46)$$

$$sum3 = U1 + U2 \quad (47)$$

$$sum4 = V1 + V2 \quad (48)$$

$$diff1 = sum1 - sum3 \quad (49)$$

$$diff2 = sum2 - sum4 \quad (50)$$

$$ratio = diff1/diff2 = \tan(2\alpha); \quad (51)$$

and the angle $\alpha$ can then be calculated as:

$$\alpha = (\arctan R)/2 \quad (52).$$

Simulations have shown that this sensor has the following characteristics:
1) the position $\alpha$ thus determined is substantially insensitive (or at least has a reduced sensitivity) to position offset, (even though not perfect if the diameter of the imaginary circle is too small, as discussed in relation with FIG. 13),
2) the position $\alpha$ thus determined is substantially insensitive (or at least has a reduced sensitivity) to a constant external magnetic field,
3) the position $\alpha$ thus determined is substantially insensitive (or at least has a reduced sensitivity) to "some" constant field gradients, in particular dBz/dx and dBz/dy, but in contrast to the six-pole magnet, not to the other first order terms: dBx/dx, dBx/dy, dBy/dx and dBy/dy. Nevertheless, this embodiment is still an improvement of prior art sensors, which do not compensate against any field gradient.

Preliminary simulations seem to indicate that the advantages obtained by the sensor of FIG. 25 (with twelve sensor elements in combination with a six-pole magnet) can also be obtained with an eight-pole magnet in combination with sixteen Hall-elements, or a ten-pole magnet and twenty Hall-elements, partitioned in four groups arranged in a similar manner as above, and using formulas similar to [39] to [42] as described above, but slightly adapted to take into account the different number of elements per group. Indeed, an eight-pole magnet would be measured by sixteen sensor elements, partitioned in four groups S, T, U, V, each group having 4 sensor elements located at an equidistant angle of 360°/4=90° on a virtual circle, the elements of the second group T being located at the positions which would be assumed when the elements of the first group S would be rotated over 180°/Np=22,5° since Np=8 for an eight-pole magnet. The elements of the third group U being located at the positions which would be assumed when the elements of the second group T would be rotated over another 180°/Np=22,5°, and the elements of the fourth group V being located at the positions which would be assumed when the elements of the third group U would be rotated over another 180°/Np=22,5°. A disadvantage of a configuration with eight poles, however, is that the angular range is reduced to the range from 0° to 90°, and that the dimensions and tolerances of the magnet decrease as the number of poles increases.

But the invention is not limited to an eight-pole, and in a similar manner, the magnetic field caused by a ten-pole magnet could be measured by twenty sensor elements, partitioned in four groups S, T, U, V, each group having 5 sensor elements located at an equidistant angle of 360°/5=72° on a virtual circle, the elements of the second group T being located at the positions which would be assumed when the elements of the first group S would be rotated over 180°/Np=18° since Np=10 for an eight-pole magnet. The elements of the third group U being located at the positions which would be assumed when the elements of the second group T would be rotated over another 18°, and the elements of the fourth group V being located at the positions which would be assumed when the elements of the third group U would be rotated over another 18°.

The following table summarizes the most important features of several envisioned sensors with a 4-pole and 6-pole ring magnet, most of which embodiments are described in detail above. Some simulations and tests are still ongoing.

TABLE 1

| nr of magnet poles Np | nr of sensor elements+ (groups) | algorithm | orientation of the sensor elements | sensitivity position error | sensitivity constant ext field | sensitivity constant ext field gradient |
|---|---|---|---|---|---|---|
| 4 (*1) | 4 (S, T) | algorithm1 | Br | s-ins | s-ins | yes |
| 4 (*1) | 4 (S, T) | algorithm1 | Bt | s-ins | s-ins | yes |
| 4 (*1) | 4 (S, T) | algorithm1 | Bz | some | yes | yes |
| 4 (*2) | 8 (S, T, U, V) | algorithm2 | Br | s-ins | s-ins | yes |
| 4 (*2) | 8 (S, T, U, V) | algorithm2 | Bt | s-ins | s-ins | yes |
| 4 (*3) | 8 (S, T, U, V) | algorithm2 | Bz | some | s-ins | s-not |

TABLE 1-continued

| nr of magnet poles Np | nr of sensor elements+ (groups) | algorithm | orientation of the sensor elements | sensitivity position error | sensitivity constant ext field | sensitivity constant ext field gradient |
|---|---|---|---|---|---|---|
| 6 | 6(S, T) | algorithm1 | Br | s-ins | s-ins | yes |
| 6 | 6(S, T) | algorithm1 | Bt | s-ins | s-ins | yes |
| 6 | 6(S, T) | algorithm1 | Bz | some | s-ins | yes |
| 6 | 12(S, T, U, V) | algorithm1 | Br | s-ins | s-ins | yes |
| 6 | 12(S, T, U, V) | algorithm1 | Bt | s-ins | s-ins | yes |
| 6 | 12(S, T, U, V) | algorithm2 | Br | s-ins (*4) | s-ins | s-ins |
| 6 | 12(S, T, U, V) | algorithm2 | Bt | s-ins (*4) | s-ins | s-ins |
| 6 | 12(S, T, U, V) | algorithm2 | Bz | some (*4) | s-ins | s-ins | wherein "s-ins" stands for "substantially insenstive", and wherein algorithm1 is based on the formula: arctan($\Sigma$(Si)/$\Sigma$(Ti)) described above, as exemplified for example by the formulas [22] to [25], and wherein algorithm2 is based on the formula: arctan(($\Sigma$(Si) − $\Sigma$(Ui))/($\Sigma$(Ti) − $\Sigma$(Vi)) as described above, as exemplified for example by the formulas [39] to [42].
(*1) This structure is not robust to gradients.
(*2) This structure is not robust to Bx and By gradients.
(*3) This structure is robust to all gradients, since here Bx and By have no impact. Only Bz is measured and constant gradients on Bz are cancelled.
(*4) Preliminary tests point out that the off-axis situation is not completely robust. It is however quite good up to 0.7 mm, but then angle errors are increasing.

The invention claimed is:

1. A magnetic position sensor, for measuring an angular position of a magnetic source being a multi-pole magnet having at least four magnet poles,
the magnetic position sensor comprising a plurality of sensor elements, located substantially on a circle, for measuring at least one magnetic field component of a magnetic field provided by the magnetic source and for providing measurement signals indicative of the at least one magnetic field component, wherein the plurality of sensor elements are partitioned in at least a first group and a second group, each element within each group being located at equidistant angular positions on the entire circle, wherein the sensor elements of the first group are interleaved with the sensor elements of the second group,
the magnetic position sensor comprising a calculator configured for determining the angular position based on the measurement signals provided by the sensor elements of the first group and on the measurement signals provided by the sensor elements of the second group.

2. The magnetic position sensor according to claim 1, wherein the number of sensor elements of the different groups is equal.

3. The magnetic position sensor according to claim 1, wherein the sensor elements are oriented in the same direction.

4. The magnetic position sensor according to claim 1, wherein the sensor elements comprise horizontal Hall elements.

5. The magnetic position sensor according to claim 1, wherein the sensor elements comprise vertical Hall elements.

6. The magnetic position sensor according to claim 1, wherein the angular distance between an element of the first group and an element of the second group is equal to 30° or 45° or 60° or 90°.

7. The magnetic position sensor according to claim 1, wherein the calculator is adapted for calculating a first sum or first average of the signals provided by the sensor elements of the first group, and for calculating a second sum or second average of the signals provided by the sensor elements of the second group, and for determining the angular position based on one or more values selected from the group consisting of the first sum, the first average, the second sum and the second average.

8. The magnetic position sensor according to claim 1, wherein the groups are arranged such that the signals provided by the sensor elements of the first group have a phase difference with the signals provided by the sensor elements of the second group.

9. The magnetic position sensor according to claim 4, wherein the horizontal Hall elements are combined with integrated magnetic concentrators to further amplify the signal and to redirect an in-plane magnetic field into the axial direction.

10. The magnetic position sensor according to claim 4, the magnetic position sensor further comprising an integrated magnetic concentrator located on top of the horizontal Hall elements.

11. The magnetic position sensor according to claim 4, the magnetic position sensor further comprising an integrated magnetic concentrator comprising a plurality of elongated parts located at a distance from the Hall elements or above the Hall elements and oriented in radial directions.

* * * * *